US008200635B2

(12) United States Patent  (10) Patent No.: US 8,200,635 B2
Mayer et al.  (45) Date of Patent: Jun. 12, 2012

(54) LABELING ELECTRONIC DATA IN AN ELECTRONIC DISCOVERY ENTERPRISE SYSTEM

(75) Inventors: Michael J. Mayer, Charlotte, NC (US); Brian L. Toomey, Charlotte, NC (US); David M. Andersen, Charlotte, NC (US); Emerson D. Miller, Charlotte, NC (US); Phillip L. Richards, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 304 days.

(21) Appl. No.: 12/627,890

(22) Filed: Nov. 30, 2009

(65) Prior Publication Data

US 2010/0250488 A1   Sep. 30, 2010

Related U.S. Application Data

(60) Provisional application No. 61/164,276, filed on Mar. 27, 2009.

(51) Int. Cl.
  *G06F 17/30*  (2006.01)
  *G06F 7/00*  (2006.01)
(52) U.S. Cl. ........................... 707/641; 707/802
(58) Field of Classification Search ................ 707/641
  See application file for complete search history.

(56) References Cited

U.S. PATENT DOCUMENTS

| | | |
|---|---|---|
| 6,119,137 A | 9/2000 | Smith et al. |
| 6,601,108 B1 | 7/2003 | Marmor |
| 6,658,625 B1 | 12/2003 | Allen |
| 6,941,361 B1 | 9/2005 | Fink et al. |
| 7,076,543 B1 | 7/2006 | Kirti et al. |
| 7,124,249 B1 | 10/2006 | Darcy |
| 7,134,020 B2 | 11/2006 | Eagle et al. |
| 7,376,969 B1 | 5/2008 | Njemanze et al. |
| 7,451,103 B1 | 11/2008 | Boyle et al. |
| 7,451,139 B2 | 11/2008 | Namba |
| 7,765,181 B2 | 7/2010 | Thomas et al. |
| 7,895,229 B1 | 2/2011 | Paknad |

(Continued)

FOREIGN PATENT DOCUMENTS

EP  1093068 A2  4/2001

(Continued)

OTHER PUBLICATIONS

Ciravegna et al.: "User-System Cooperation in Document Annotation based on Information Extraction" 2002. Proceedings of the 13th International Conference on Knowledge Engineering and Knowledge Management.

(Continued)

*Primary Examiner* — Kuen Lu
(74) *Attorney, Agent, or Firm* — Michael A. Springs; Moore & Van Allen PLLC; James C. Edwards

(57) ABSTRACT

Embodiments herein disclosed relate to methods, systems and computer program products that provide an enterprise wide e-discovery system configured to search myriad data sources across an enterprise to identify electronic data relevant to a particular data request, harvest the relevant electronic data, filter the electronic data to identify request file types, transfer the request file types to a data store, and assign labels, such as barcodes, to the requested file types for the purpose of producing, in an organized fashion, all requested electronic data that is in the enterprise's possession.

27 Claims, 11 Drawing Sheets

U.S. PATENT DOCUMENTS

| | | | |
|---|---|---|---|
| 8,073,729 | B2 | 12/2011 | Kisin et al. |
| 2002/0194097 | A1 | 12/2002 | Reitz |
| 2002/0198629 | A1 | 12/2002 | Ellis |
| 2003/0154199 | A1 | 8/2003 | Thomas et al. |
| 2003/0182375 | A1 | 9/2003 | Zhu et al. |
| 2003/0200308 | A1 | 10/2003 | Tameda et al. |
| 2004/0098424 | A1 | 5/2004 | Seidenberg et al. |
| 2004/0260733 | A1 | 12/2004 | Adelstein et al. |
| 2005/0086720 | A1* | 4/2005 | Shimizu et al. ............. D16/200 |
| 2005/0152235 | A1* | 7/2005 | Hoshizawa ................ 369/30.16 |
| 2005/0177527 | A1 | 8/2005 | Morris et al. |
| 2006/0095795 | A1 | 5/2006 | Nakamura et al. |
| 2006/0167877 | A1 | 7/2006 | Lee et al. |
| 2006/0256739 | A1 | 11/2006 | Seier et al. |
| 2007/0027974 | A1 | 2/2007 | Lee et al. |
| 2007/0073894 | A1 | 3/2007 | Erickson et al. |
| 2007/0088754 | A1* | 4/2007 | Brannon et al. ............. 707/200 |
| 2007/0112783 | A1 | 5/2007 | McCreight et al. |
| 2007/0162547 | A1 | 7/2007 | Ross |
| 2007/0208918 | A1* | 9/2007 | Harbin et al. ................ 711/162 |
| 2007/0226170 | A1 | 9/2007 | Sun |
| 2007/0271517 | A1 | 11/2007 | Finkelman et al. |
| 2007/0288579 | A1 | 12/2007 | Schunemann |
| 2008/0027895 | A1 | 1/2008 | Combaz |
| 2008/0046260 | A1 | 2/2008 | Ghielmetti et al. |
| 2008/0061146 | A1 | 3/2008 | Komaki |
| 2008/0082672 | A1 | 4/2008 | Garrett |
| 2008/0168145 | A1 | 7/2008 | Wilson |
| 2008/0252936 | A1 | 10/2008 | Stratton |
| 2008/0288479 | A1 | 11/2008 | Paknad et al. |
| 2008/0294492 | A1 | 11/2008 | Simpson et al. |
| 2009/0001162 | A1 | 1/2009 | Asher et al. |
| 2009/0006973 | A1 | 1/2009 | Newell et al. |
| 2009/0043819 | A1 | 2/2009 | Searl et al. |
| 2009/0132262 | A1 | 5/2009 | Paknad |
| 2009/0164522 | A1 | 6/2009 | Fahey |
| 2009/0165026 | A1 | 6/2009 | Paknad et al. |
| 2009/0183253 | A1* | 7/2009 | Kates ............................. 726/16 |
| 2009/0286219 | A1 | 11/2009 | Kisin et al. |
| 2010/0017239 | A1 | 1/2010 | Saltzman et al. |
| 2010/0033750 | A1* | 2/2010 | Tischler et al. ............. 358/1.14 |
| 2010/0082382 | A1 | 4/2010 | Kisin et al. |
| 2010/0082555 | A1 | 4/2010 | Ogawa et al. |
| 2010/0205020 | A1 | 8/2010 | Losey |
| 2010/0223108 | A1 | 9/2010 | Quinn, Jr. |
| 2011/0040600 | A1 | 2/2011 | Paknad et al. |
| 2011/0173033 | A1 | 7/2011 | Paknad et al. |

FOREIGN PATENT DOCUMENTS

| | | |
|---|---|---|
| EP | 1349089 A2 | 1/2003 |
| WO | 01/27765 A1 | 4/2001 |
| WO | 0210967 A2 | 2/2002 |
| WO | 02071192 A2 | 9/2002 |
| WO | 03/065256 A1 | 8/2003 |
| WO | 2004092902 A2 | 10/2004 |
| WO | 2006001833 A2 | 1/2006 |
| WO | 2006031836 A2 | 3/2006 |
| WO | WO 2006/031836 A2 | 3/2006 |
| WO | 2006052441 A2 | 5/2006 |
| WO | 2007/044709 A2 | 4/2007 |
| WO | 2007076515 A2 | 7/2007 |
| WO | WO 2007/076515 | 7/2007 |
| WO | 2008009991 A1 | 1/2008 |
| WO | 2008070415 A2 | 6/2008 |
| WO | WO 2008/070415 A2 | 6/2008 |

OTHER PUBLICATIONS

Buchholz et al.: "On the Role of File System Metadata in Digital Forensics", Journal of Digital Investigation, vol. 1(4), pp. 297-308, Dec. 1, 2004.

Golden et al. Scalpel: "A Frugal, High Performance File Carver" 2005 Digital Forensic Research Workshop (DFRWS) New Orleans, LA.

Manson et al.: "Is the Open Way a Better Way? Digital Forensics using Open Source Tools". System Sciences, 2007. HICSS 2007. 40th Annual Hawaii International Conference on, IEEE, PI, Jan. 1, 2007. ISBN:978-0-7695-2755-0.

Berinato: "The Rise of Anti-Forensics" http/www.csoonline.com/article/print/221208. Jun. 8, 2007.

Anonymous: "EDRM LegalTech 2009 Luncheon Presentation" E.D. R.M. The Electronic Discovery Reference Model Feb. 9, 2009. Retrieved from the Internet: http://www.edrm.net/wp-content/plugins/download-monitor/download.php?id=6.

Singapore Patent Application No. 201002126-9 Search Report and Written Opinion mailed Aug. 3, 2011.

Singapore Patent Application No. 201002129-3 Search Report and Written Opinion mailed Aug. 3, 2011.

Singapore Patent Application No. 201002128-5 Search Report and Written Opinion mailed Aug. 3, 2011.

Singapore Patent Application No. 201002139-2 Search Report and Written Opinion mailed Aug. 3, 2011.

Singapore Patent Application No. 201002137-6 Search Report and Written Opinion mailed Aug. 15, 2011.

Singapore Patent Application No. 201002138-4 Search Report and Written Opinion mailed Aug. 19, 2011.

Singapore Patent Application No. 201002125-1 Search Report and Written Opinion mailed Aug. 24, 2011.

Singapore Patent Application No. 201002134-3 Search Report and Written Opinion mailed Aug. 25, 2011.

Singapore Patent Application No. 201002124-4 Search Report and Written Opinion mailed Aug. 25, 2011.

Singapore Patent Application No. 201002142-6 Search Report and Written Opinion mailed Sep. 5, 2011.

Singapore Patent Application No. 201002144-2 Search Report and Written Opinion mailed Sep. 5, 2011.

Singapore Patent Application No. 201002140-0 Search Report and Written Opinion mailed Sep. 27, 2011.

J. Barlow, L. Bean and D.D. Hott: "Employee 'Spy' Software: Should You use it?" The Journal of Corporate Accounting & Finance, Document No. XP-002601405, pp. 7-12; Retrieved from the Internet: URL: http://onlinelibary.wiley.com/10.1002/icaf.10162/abstract [retrieved on Sep. 17, 2010].

Dan Manson et al.: "Is the Open Way a Better Way? Digital Forensics using Open Source Tools", Proceedings of the 40$^{th}$ Hawaii International Conference on System Sciences-2007 [dated Jan. 1, 2007]; 10 pages total.

Anonymous: "EDRM LegalTech 2009 Luncheon Presentation", E.D.R.M.—The Electronic Discovery Reference Model; Document No. XP-002601404 LegalTech Lunch & Learn, Feb. 3, 2009, LegalTech New York; from the Internet: URL:http//edrm.net/002/wp-content/uploads/2009/09/EDRM_LegalTech.pdf [retrieved Sep. 17, 2010].

Extended European Search Report dated Sep. 22, 2010 for European Application No. EP 10 25 0584.

U.S. Appl. No. 12/534,375, filed Aug. 3, 2009.
U.S. Appl. No. 12/614,059, filed Nov. 6, 2009.
U.S. Appl. No. 12/618,430, filed Nov. 13, 2009.
U.S. Appl. No. 12/618,443, filed Nov. 13, 2009.
U.S. Appl. No. 12/627,791, filed Nov. 30, 2009.
U.S. Appl. No. 12/627,996, filed Nov. 30, 2009.
U.S. Appl. No. 12/696,653, filed Jan. 29, 2010.
U.S. Appl. No. 12/702,641, filed Feb. 9, 2010.
U.S. Appl. No. 12/729,987, filed Mar. 23, 2010.
U.S. Appl. No. 12/730,780, filed Mar. 24, 2010.
U.S. Appl. No. 12/730,785, filed Mar. 24, 2010.
U.S. Appl. No. 12/730,790, filed Mar. 24, 2010.
U.S. Appl. No. 12/730,792, filed Mar. 24, 2010.
U.S. Appl. No. 12/730,799, filed Mar. 24, 2010.
U.S. Appl. No. 12/730,807, filed Mar. 24, 2010.
U.S. Appl. No. 12/730,818, filed Mar. 24, 2010.
U.S. Appl. No. 12/730,821, filed Mar. 24, 2010.
U.S. Appl. No. 12/730,840, filed Mar. 24, 2010.
U.S. Appl. No. 12/730,848, filed Mar. 24, 2010.
U.S. Appl. No. 12/730,851, filed Mar. 24, 2010.
U.S. Appl. No. 12/731,657, filed Mar. 25, 2010.

SysTools Software, "Export Notes—Notes Email Migration Tool", 2008, available online: http://web.archive.org/web/20080201104418/http://www.exportlotusnotes.com/export-notes.

Process Text Group, "ABC Amber BlackBerry Converter", 2008, available online: http:web.archive.org/web/20080302025411/http://www.processtext.com/abcblackberry.html.

Search Report and Written Opinion for Singapore Application No. 201002122-8 mailed Jan. 3, 2012.

Search Report and Written Opinion for Singapore Application No. 201002141-8 mailed Jan. 3, 2012.

Search Report and Written Opinion for Singapore Application No. 201002143-8 mailed Jan. 3, 2012.

Search Report and Written Opinion for Singapore Application No. 201002120-2 mailed Feb. 10, 2012.

Second Written Opinion for Singapore Application No. 201002126-9 mailed Mar. 14, 2012.

Second Written Opinion for Singapore Application No. 201002128-5 mailed Mar. 14, 2012.

Second Written Opinion for Singapore Application No. 201002129-3 mailed Mar. 14, 2012.

Second Written Opinion for Singapore Application No. 201002139-2 mailed Mar. 14, 2012.

Danish Patent and Trademark Office. Singapore Examination Report mailed Mar. 15, 2012. Applicant: Bank of America Corporation. Singapore Patent Application No. 201002124-4. DKPTO SE No. SE 2012 00392v. English Language. 10 pages. Date of Examination Report: Mar. 12, 2012.

Danish Patent and Trademark Office. Singapore Examination Report mailed Mar. 15, 2012. Applicant: Bank of America Corporation. Singapore Patent Application No. 201002124-4. SKPTO SE No. SE 2012 00392y. English Language. 10 pages. Date of Examination Report: Mar. 12, 2012.

* cited by examiner

LABELING ELECTRONIC DATA IN AN ELECTRONIC DISCOVERY ENTERPRISE SYSTEM

CLAIM OF PRIORITY UNDER 35 U.S.C. §119

The present Application for Patent claims priority to Provisional Application No. 61/164,276 entitled "Electronic Discovery System" filed Mar. 27, 2009, and assigned to the assignee hereof and hereby expressly incorporated by reference herein.

FIELD

In general, embodiments of the invention relate to methods, systems and computer program products for electronic discovery and, more particularly, collecting electronic data from a data source, transferring the electronic data to a data store, and assigning a label, such as a barcode, to the electronic data.

BACKGROUND

Electronic discovery, commonly referred to as e-discovery, refers to any process in which electronic data is sought, located, secured and searched with the intent of using it as evidence in a legal proceeding, an audit, a securities investigation, a forensics investigation or the like. E-discovery can be carried out offline on a particular computer or it can be accomplished in a network environment.

The nature of digital data makes it extremely well-suited for investigation. In particular, digital data can be electronically searched with ease, whereas paper documents must be scrutinized manually. Furthermore, digital data is difficult or impossible to completely destroy, particularly if the data is stored in a network environment. This is because the data appears on multiple hard drives, and because digital files, even if deleted, generally can be undeleted. In fact, the only reliable means of destroying digital data is to physically destroy any and all hard drives where it is stored.

In the process of electronic discovery, data of all types can serve as evidence. This can include text, image, calendar event data, databases, spreadsheets, audio files, multimedia files, web sites and computer programs. Electronic mail (i.e., e-mail) can be an especially valuable source of evidence in civil or criminal litigation, because people are often less careful in these exchanges than in hard copy correspondence such as written memos or postal letters.

E-discovery is an evolving field that goes far beyond mere technology. It gives rise to multiple issues, many of which have yet to be resolved. For example, identifying data required to satisfy a given discovery request, locating the appropriate set of data that has been identified, and retrieving the data once it has been identified and located all pose problems in and of themselves. This is especially evident if the data that is being identified, located and retrieved comes from an evolving or disparate enterprise, such as a corporation that has experienced mergers, acquisitions, downsizing and the like. Mergers and acquisitions mean that the technology infrastructure across the enterprise may vary, at least in the interim. However, e-discovery must be able locate and retrieve data from these disparate technology infrastructure in a timely fashion, sometimes within days of when the merger/acquisition occurs.

In addition to identifying, locating and retrieving digital data, the most critical part of any electronic discovery is the preservation of data, which involves maintaining an original source copy and storing it for preservation purposes or furthering processing. This too becomes a daunting task for the enterprise system that encompasses a myriad of different technology infrastructures and the like. Therefore, a need exists to improve the identification, location, retrieval and preservation processes, especially in instances in which the enterprise system includes disparate technology infrastructures and the like.

As previously noted, e-discovery, as opposed as conventional discovery of printed materials, provides for the ability to filter or search the data so as to reduce the volume of data to only that which is relevant to the request. Such searching is typically accomplished by determining a specific date range for the request, providing key words relevant to the case and the like. Improvements in the area of searching are greatly in need to further add efficiency to the overall e-discovery process.

Once data has been retrieved, preserved and, in some instances, searched the electronic data may be reviewed by the requesting entity, such as a law firm, securities commission or the like. While large requests are generally suited for online review, the manner in which the data is presented for review adds efficiency to the review process and ultimately drives the cost of the review process. Therefore, improvements in the manner in which data is presented for review are also desirable as a means of increasing efficiency and reducing costs.

Lastly, once the digital data has been reviewed, data identified as relevant may need to be produced in a tangible format for further analysis or legal evidentiary purposes. The produced documents must be properly identified and include necessary redactions and confidentiality markings.

Up until now, e-discovery management has been conducted on a case-by-case basis, meaning all tasking and workflow related to the e-discovery is based at the case level. Such management does not allow for finer granularity in the management of a case or for links to exist between different cases for the purpose of leveraging the e-discovery related to one case to another new or pre-existing case. Therefore, a need exists to improve the manner in which cases are managed and, in particular, how tasking and workflow are managed depending on case requirements and the like.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for electronic discovery and, in particular, improvements in electronic discovery that allow for electronic discovery to be efficiently and cost-effectively employed across a diverse enterprise. In particular, embodiments of the invention relate to systems, methods, and computer program products for collecting electronic data from a data source, transferring the electronic data to a long-term storage network, and associating the electronic data with a label, such as a barcode or some other type of indicator. For example, the label associated with the electronic data defines the year in which the data was collected from the data source and the type of data that was collected.

In some embodiments of the present invention, a method for organizing and storing electronic data in an enterprise-wide electronic data discovery system is provided. This method includes receiving a data request to collect a electronic data from a data source. After receiving the data request, this method includes using a processor to create a first identifier for the electronic data and then store the first identifier on a long-term storage network. Next, this method includes using a processor to stage the electronic data by collecting individual files of the electronic data from at least a data source and storing the collected files on a staging drive until all of the files of the electronic data are collected. This method also includes using a processor to transfer the files of the electronic from the staging drive to the long-term storage network and then associate the electronic data with the first identifier.

According to some embodiments of the method, the processor is further used to collect metadata from the files of the electronic data as the files are being transferred to the long-term storage network, store the metadata in a file log, and then store the file log separate from the files of the electronic data by storing the file log in a database that is separate from the long-term storage network. According to some embodiments of the method, the processor is also used to identify at least a specified file type from the files of the electronic data before the electronic data is transferred from the staging drive to the long-term storage network and then filter the electronic data by transferring the files of the specified file type to the long-term storage network.

In some embodiments of the method, the processor is further used to create a second identifier for the electronic data, associate the files of the electronic data that are communication files with the first identifier, and associate the files of the electronic data that are not communication files with the second identifier.

According to some embodiments of the method, an expected-number-of-files indicator is received from a third party. According to these embodiments, the expected-number-of-files indicator specifies the number of files of the electronic data that are to be collected from the data source. The method of these embodiments further includes using the processor to determine an actual-number-of-files indicator that specifies the number of files of the electronic data that were actually transferred to the long-term storage network and associated with the first identifier, wherein the actual-number-of-files indicator is determined by counting the files as the files are transferred from the staging drive to the long-term storage network. The method of these embodiments further includes using the processor to compare the expected-number-of-files indicator and the actual-number-of-files indicator and then provide a failure notification if the actual-number-of-files indicator does not match the expected-number-of-files indicator.

In some embodiments of the method, an expected-data-amount indicator is received from a third party. According to these embodiments, the expected-data-amount indicator specifies the aggregated size of files of the electronic data that are to be collected from the data source. The method of these embodiments further includes using the processor to determine an actual-data-amount indicator that specifies the aggregated size of files that were actually included in the electronic data and that were actually transferred to the long-term storage network and associated with the first identifier, wherein the actual-data-amount indicator is determined by summing the size of each of the files transferred from the staging drive to the long-term storage network. The method of these embodiments further includes using the processor to compare the expected-data-amount indicator and the actual-data-amount indicator and then provide a failure notification if the actual-data-amount indicator does not match the expected-data-amount indicator.

According to some embodiments of the method, the processor is further used to calculate a hash value for the files of the electronic data while the files are being transferred to the long-term storage network and then store the hash value separate from the files of the electronic data by storing the hash value in a database that is separate from the long-term storage network. According to these embodiments of the method, a processing request for the electronic data that is stored on the long-term storage network, and then the processor is used to ensure that the that the electronic data was not modified while it was stored on the long-term storage network by calculating a second hash value for the electronic data while the files are being transferred off of the long-term storage network and then comparing the second hash value to the hash value that was calculated when the files of the electronic data were transferred to the long-term storage network.

In some embodiments of the method, the first identifier is a serial number that indicates the year in which the data request was made and the type of data requested in by the data request. Also, in some embodiments, the data request includes a file path for retrieving the electronic data.

In other embodiments of the present invention, a system for assigning labels to electronic files in an electronic discovery management system is provided. According to some embodiments, the system includes an input device configured to receive a data request. The data request, according to some embodiments, comprises instructions to collect electronic data from a data source, instructions to filter the electronic data to identify at least one file type from among a plurality of files in the electronic data, and instructions to transfer the files of the file type to a long-term storage network. According to some embodiments, the system further includes a processor that is in communication with the input device. The processor, according to some embodiments is configured to create an identifier that is associated with the data request, wherein the identifier resides on the long-term storage network, stage the electronic data by collecting files of the electronic data from the data source and storing the files on a staging drive, filter the electronic data by identifying the files that are of the file type, transfer the files that are of the file type from the staging drive to the long-term storage network, and associate the transferred files that are of the file type with the identifier.

According to some embodiments of the system, the processor is further configured to validate the electronic data by determining the number of files that were actually transferred to the long-term storage network and comparing the number of files that were actually transferred to an expected number of files. According to some embodiments, the expected number of files is received from a third party. Also, according to some embodiments, the expected number of files represents the number of files stored on the data source that are of the file type and that are included in the electronic data.

In some embodiments of the system, the processor is configured to provide a failure notification if the number of files that were actually transferred does not match the expected number of files. Also, in some embodiments of the system, the processor is further configured to calculate a hash value for the electronic data when the files are transferred to the long-term storage network and store the hash value in a database that is separate from the long-term storage network, which is where the electronic data is stored. The processor, according to some embodiments of the system, is further configured to ensure that the electronic data was not modified while it was stored on the long-term storage network by calculating a second hash value for the electronic data when the files are transferred off of the long-term storage network and comparing the second hash value to the previously calculated hash value.

BRIEF DESCRIPTION OF THE DRAWINGS

Figure 1:
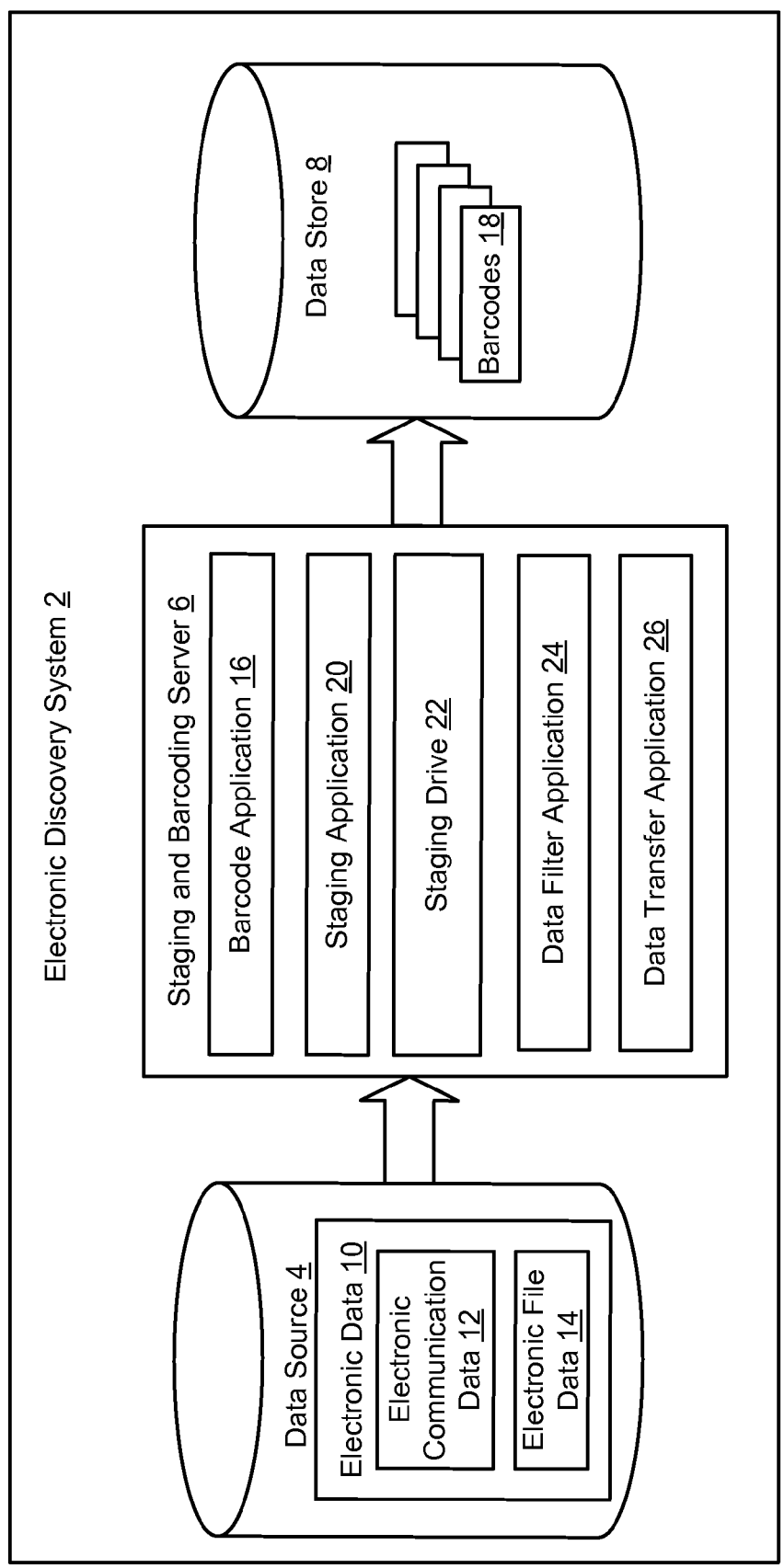
Figure 2:
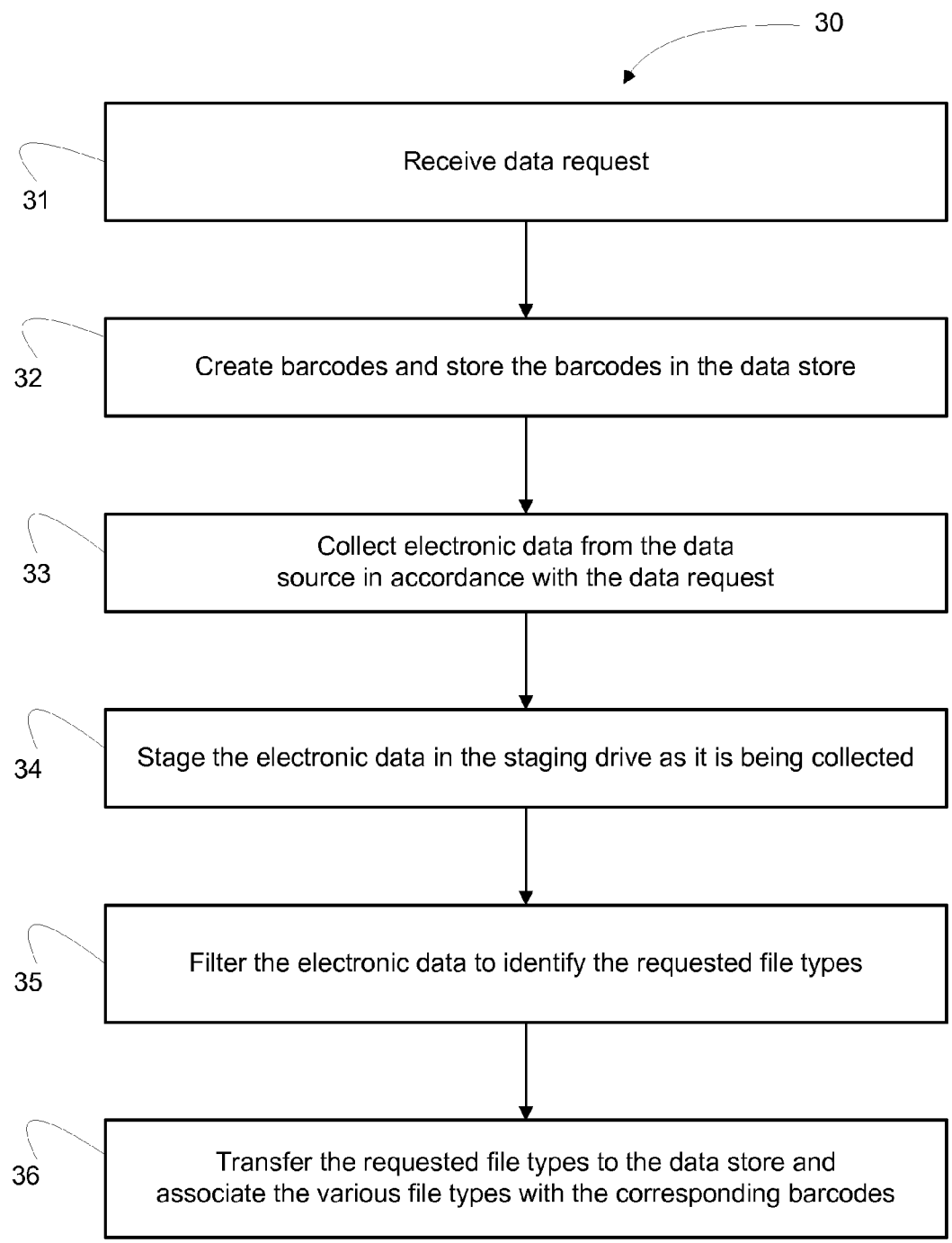
Figure 3:
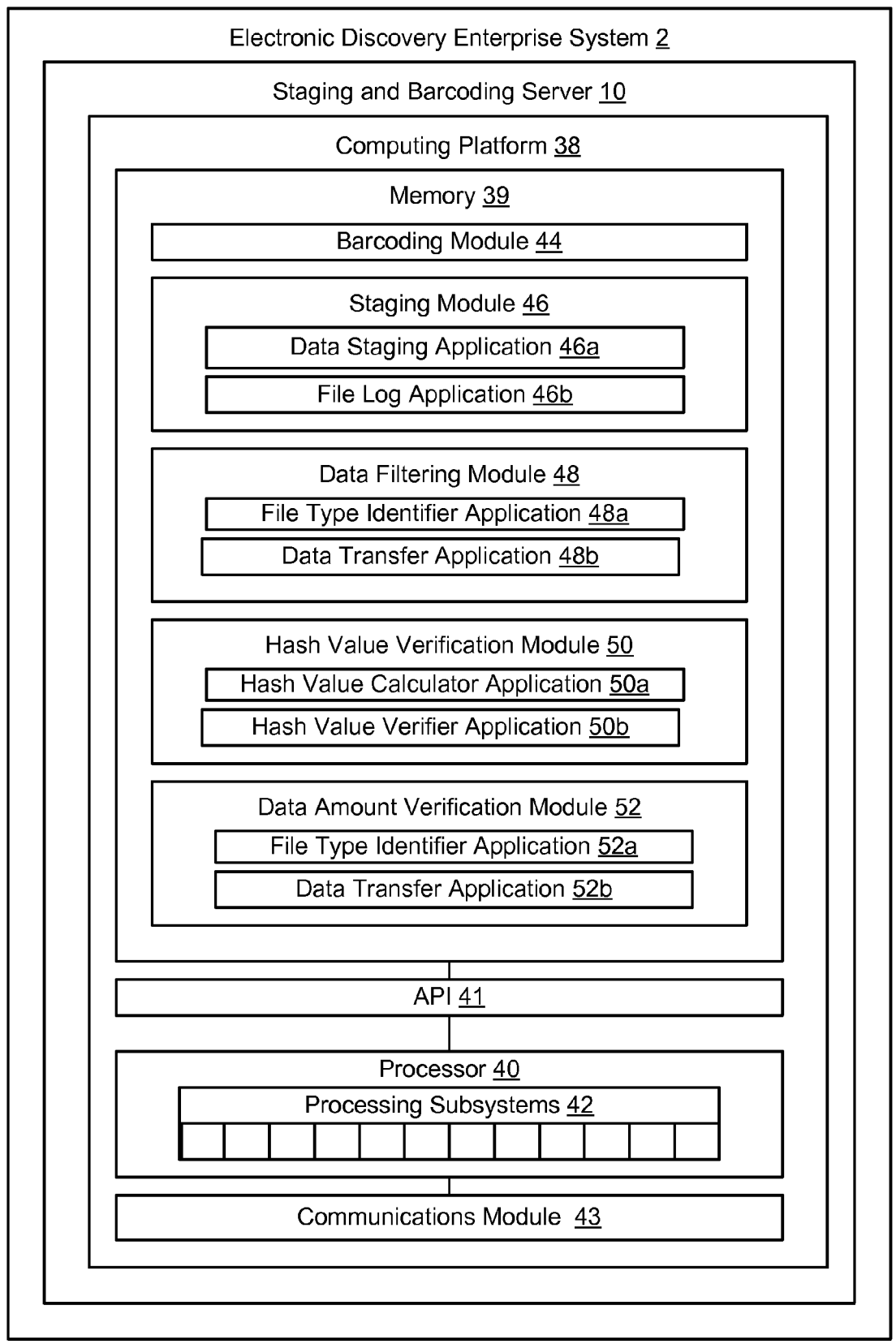
Figure 4:
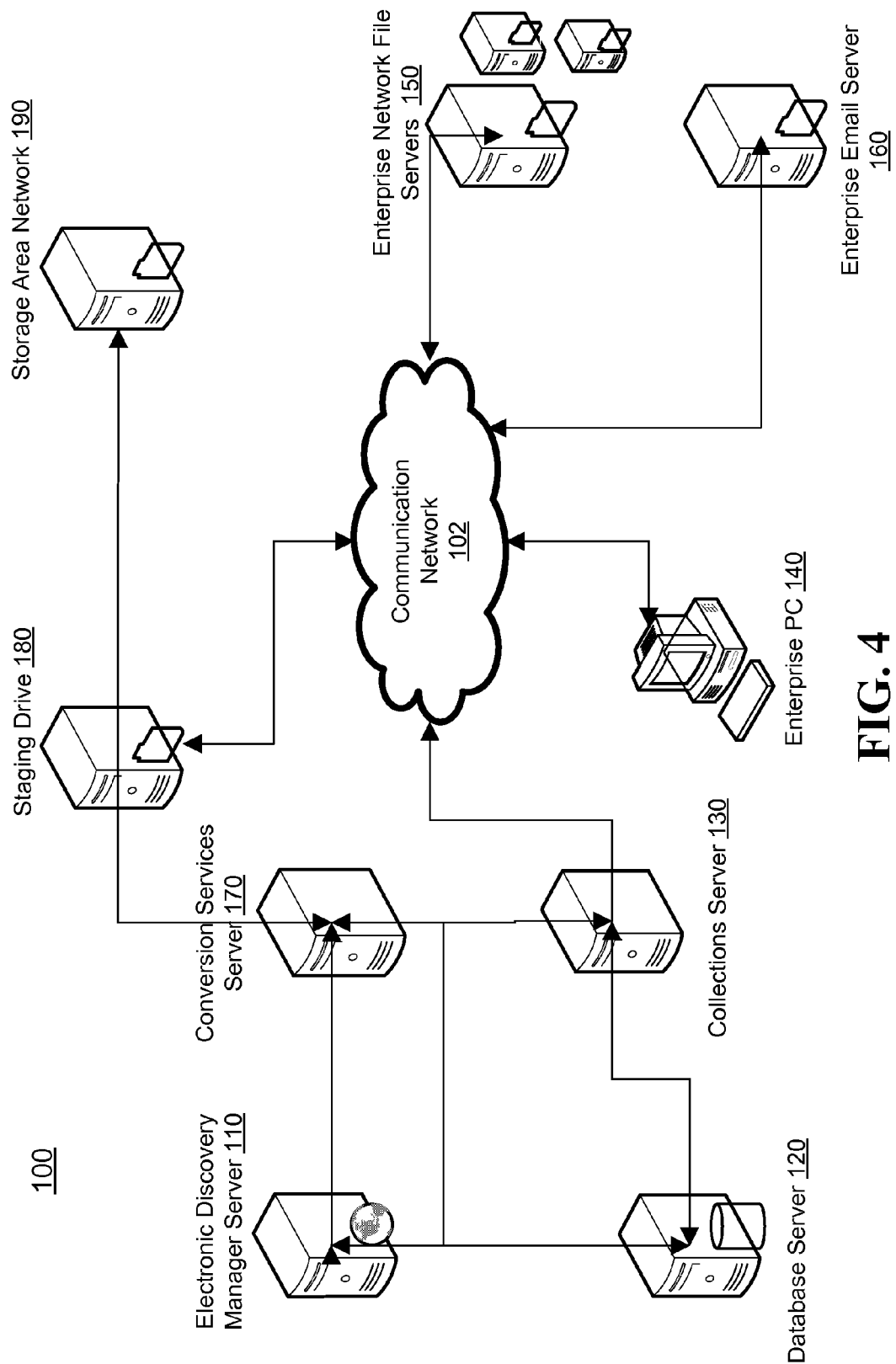
Figure 5:
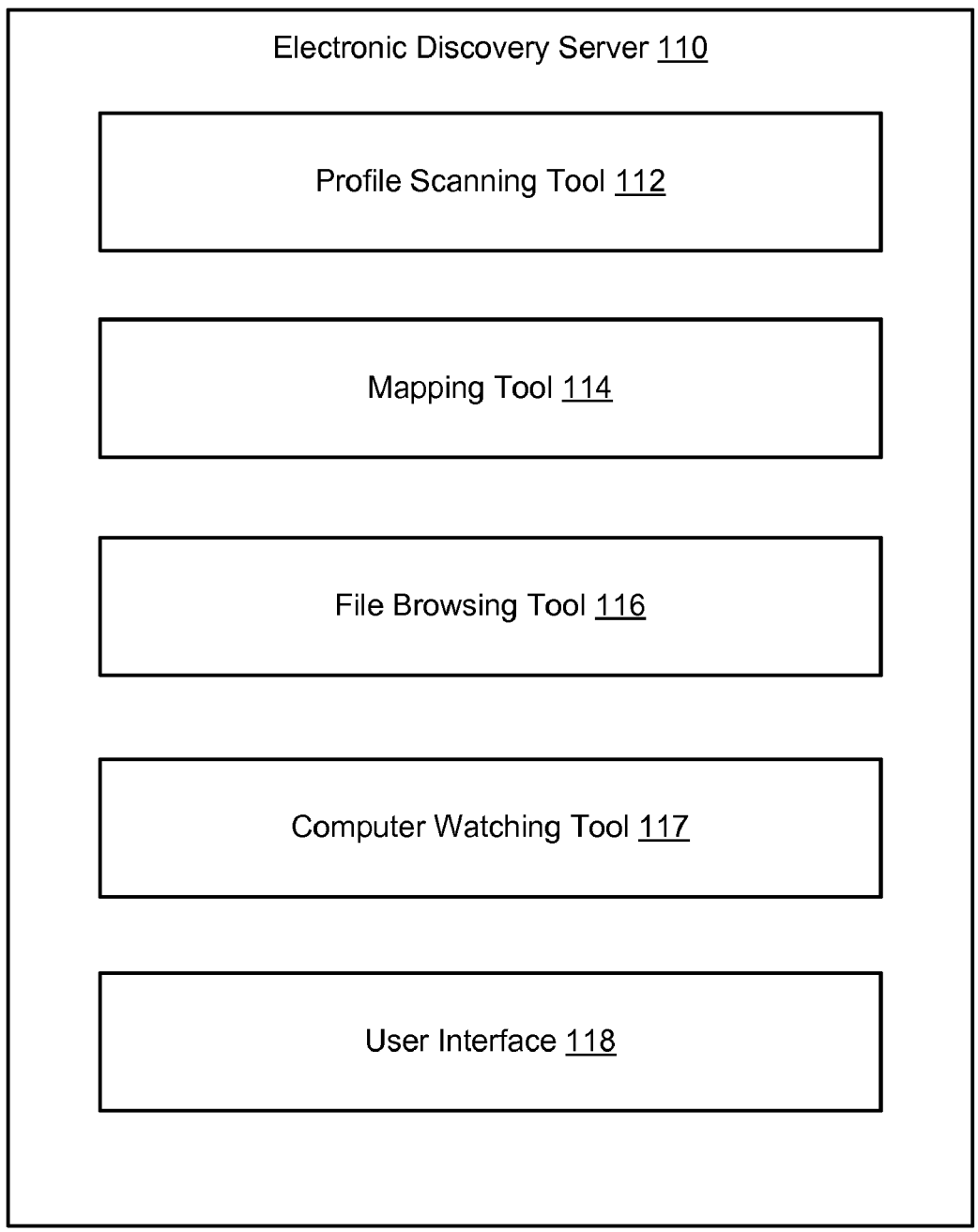
Figure 6:
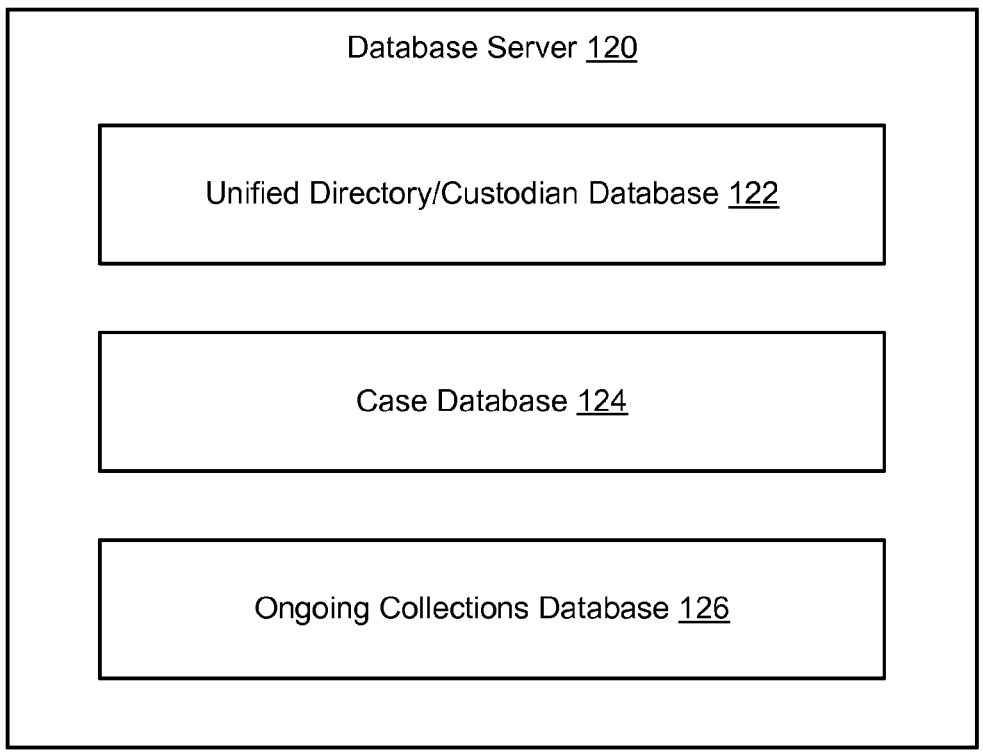
Figure 7:
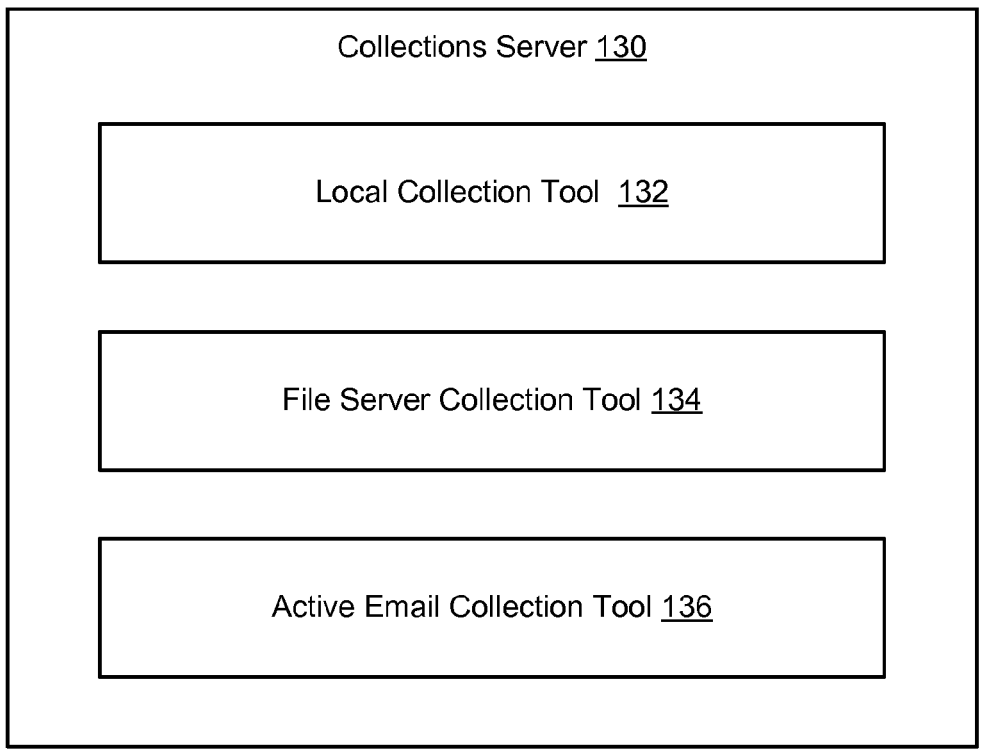
Figure 8:
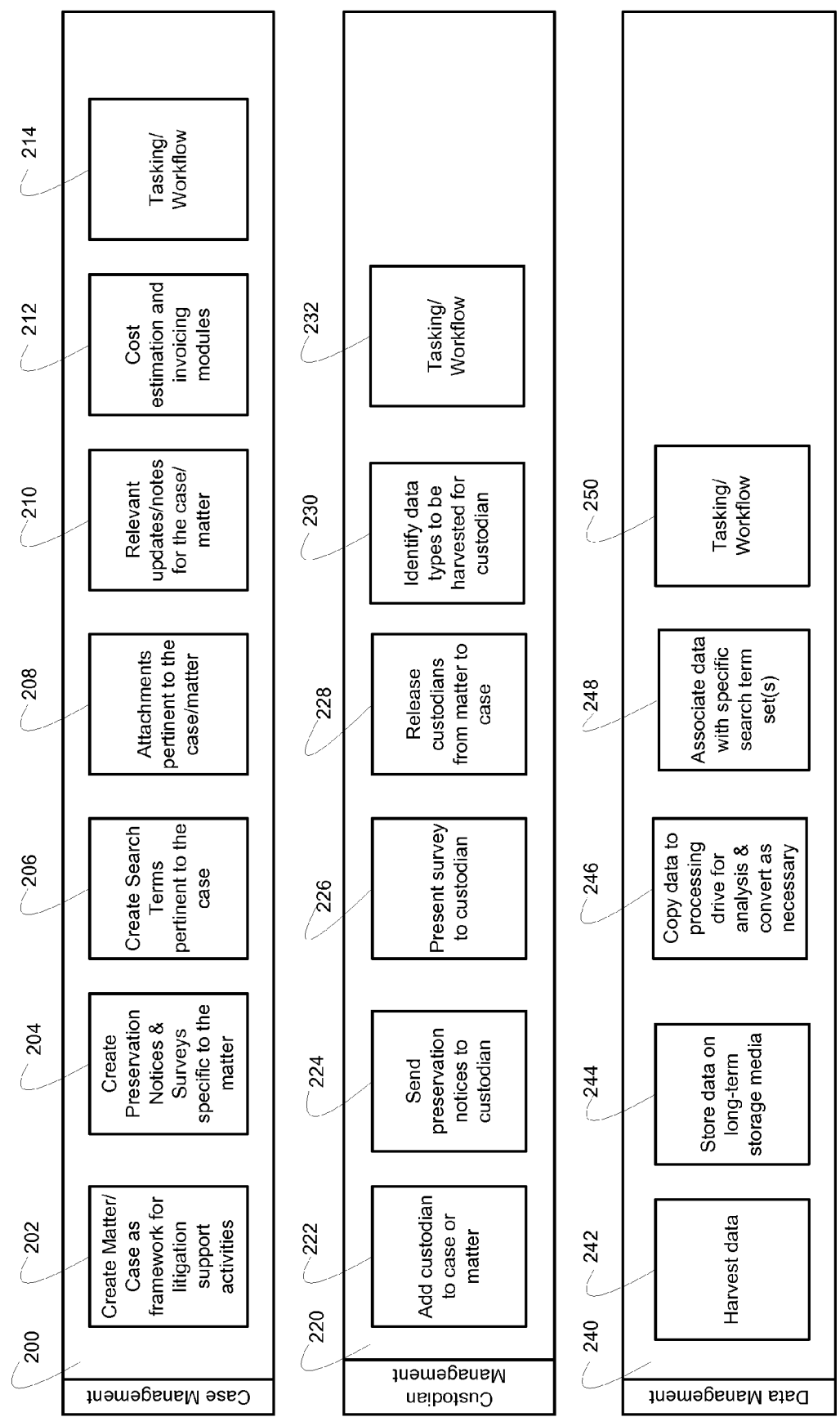
Figure 9:
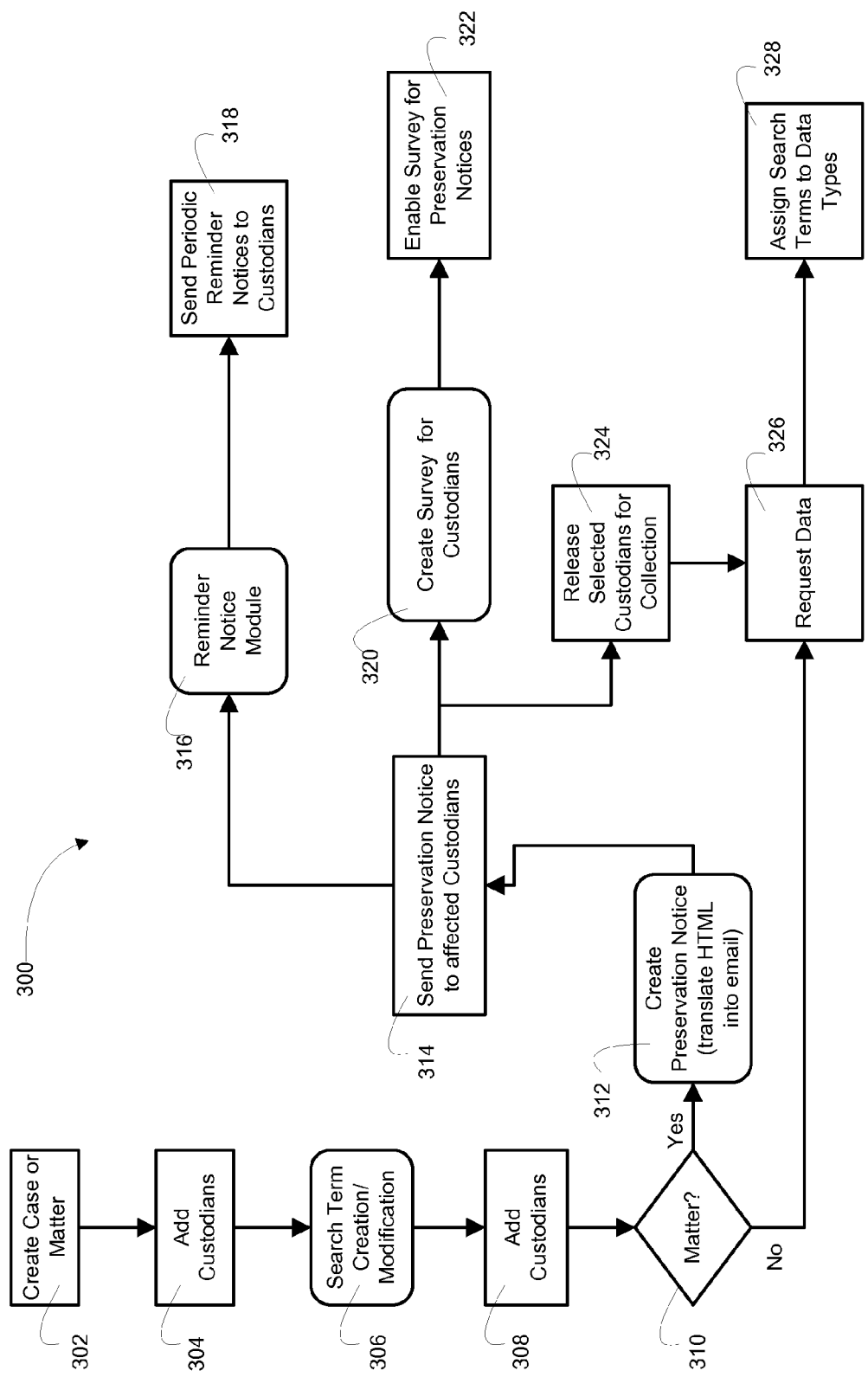
Figure 10:
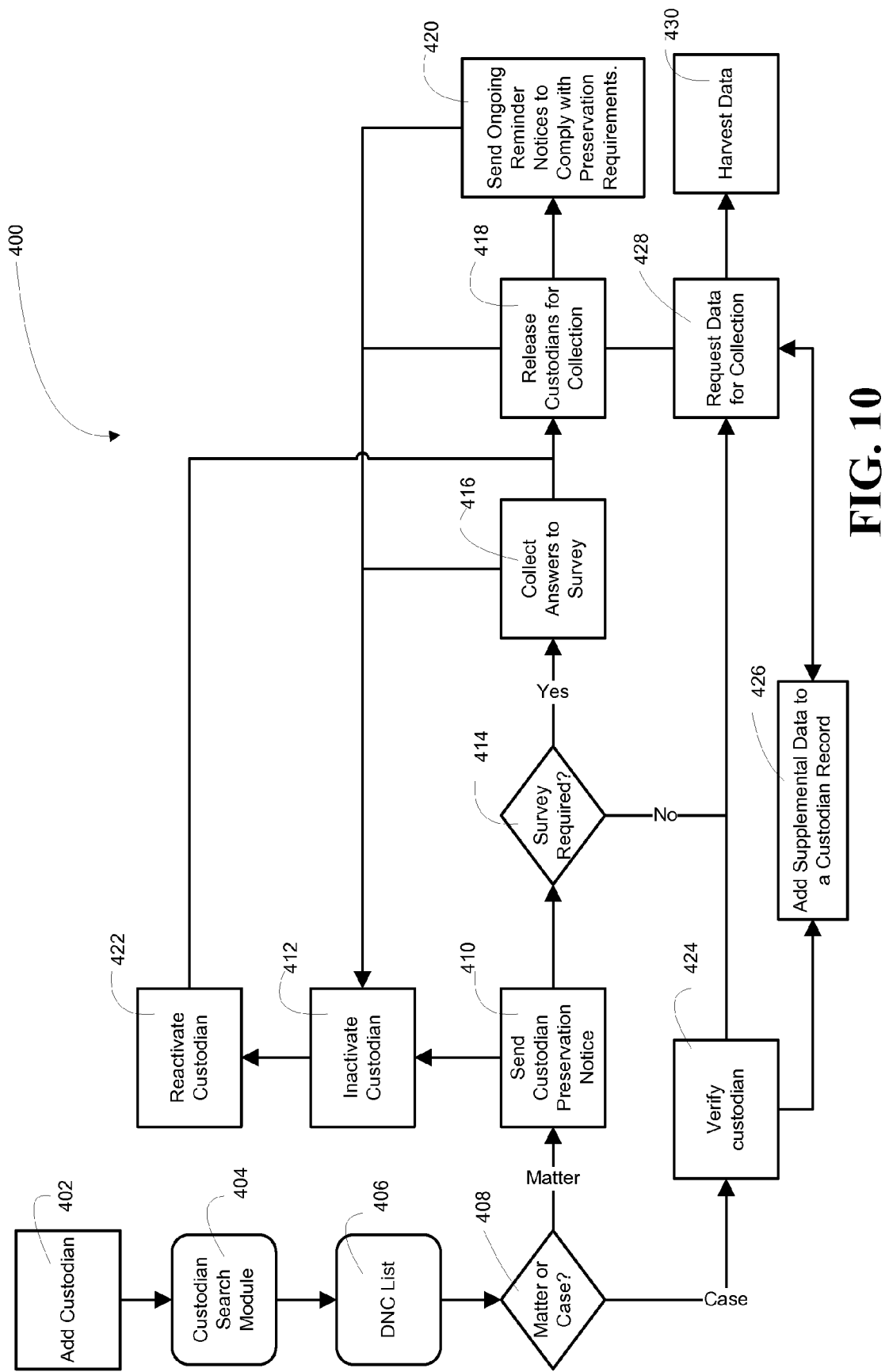
Figure 11:
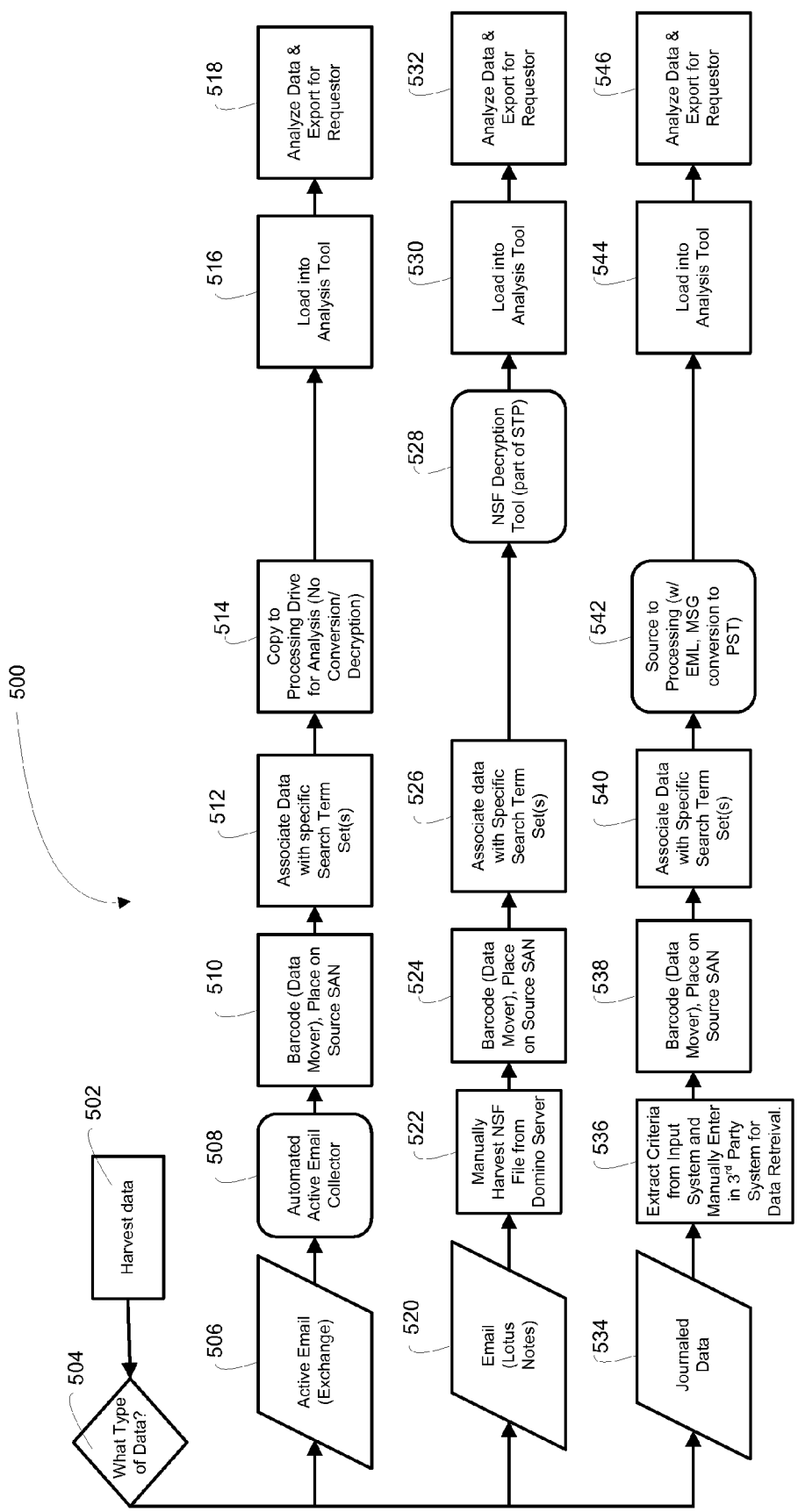
Figure 12:
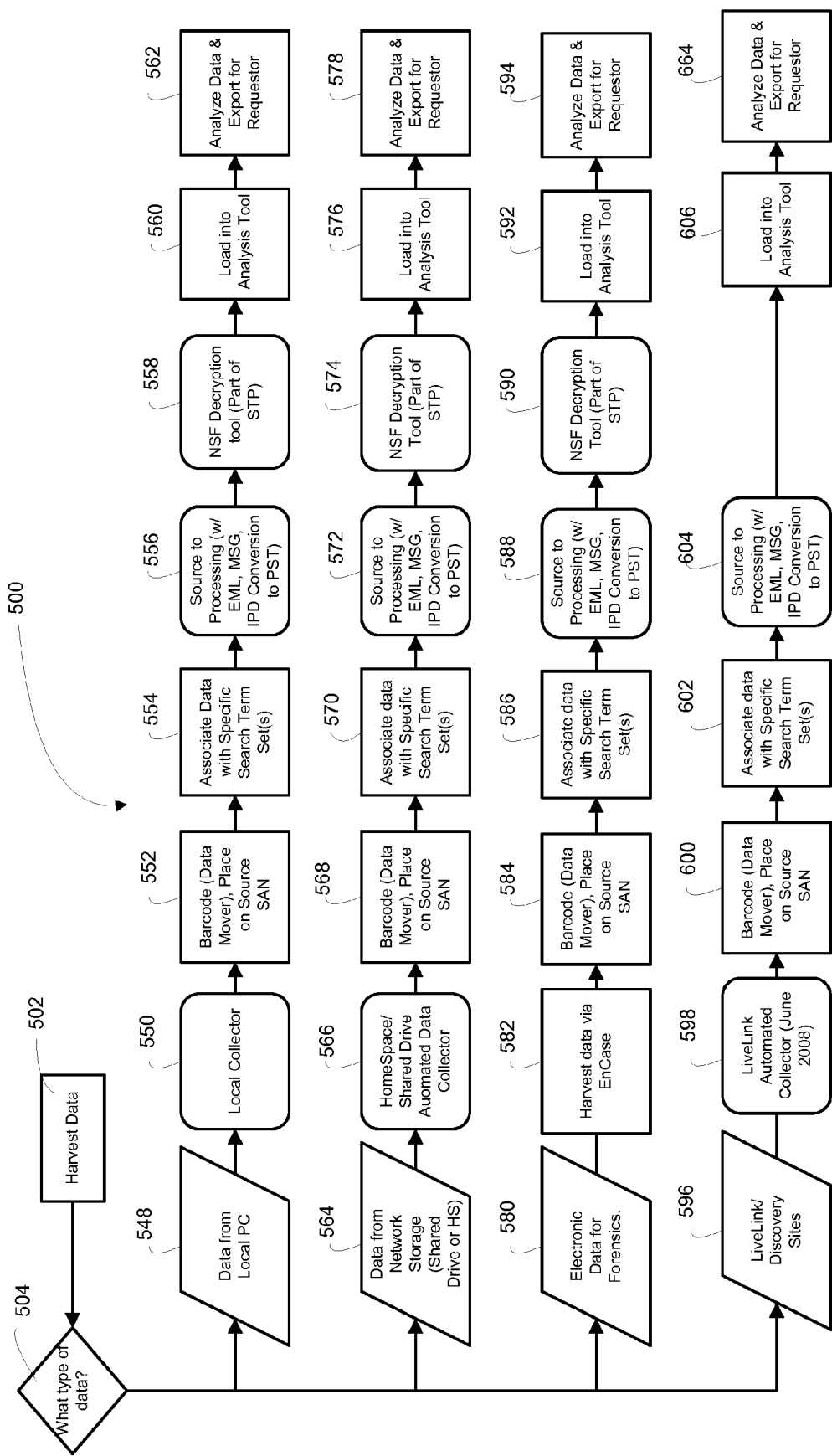

Having thus described embodiments of the invention in general terms, reference may now be made to the accompanying drawings:

FIG. 1 is a block diagram of an enterprise-wide electronic discovery system highlighting components of the system that are configured to organize and barcode electronic data, in accordance with embodiments of the present invention;

FIG. 2 is a flow diagram of a method for organizing and barcoding electronic data in an electronic discovery system, in accordance with embodiments of the present invention;

FIG. 3 is a block diagram of a barcoding server implemented within an electronic discovery system, in accordance with embodiments of the present invention;

FIG. 4 illustrates a network environment in which the processes described herein are implemented, according to one embodiments of the invention;

FIG. 5 is a block diagram of an electronic discovery manager server, in accordance with embodiments of the present invention;

FIG. 6 is a block diagram of a database server, in accordance with an embodiment of the present invention;

FIG. 7 is a block diagram of a collection server, in accordance with an embodiment of the present invention;

FIG. 8 is block diagram illustrating electronic discovery management structure, in accordance with an embodiment of the invention;

FIG. 9 is a flow diagram of a method for initiating a case or matter including creating search terms, creating and sending preservation notices, sending reminder notices and creating and sending surveys to custodians, in accordance with embodiments of the present invention;

FIG. 10 is a flow diagram of a method for custodian management in an electronic discovery system, in accordance with an embodiment of the present invention; and FIGS. 11 and 12 are flow diagrams of methods for harvesting different data types in an electronic discovery system, in accordance with an embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the present invention provide apparatus, systems, methods and computer program products that provide for electronic discovery and, more specifically, that search myriad data sources across an enterprise to identify electronic data relevant to a particular data request, harvest the relevant electronic data, filter the electronic data to identify request file types, transfer the request file types to a data store, and assign labels, such as barcodes, to the requested file types for the purpose of producing, in an organized fashion, all requested electronic data that is in the enterprise's possession.

FIG. 1 provides a block diagram of an enterprise-wide electronic discovery system 2 that highlights components of the system 2 that are configured to organize and barcode electronic data. In some embodiments, the environment of the electronic discovery system 2 is the information technology platform of an enterprise, for example a national or multi-national corporation, and includes a multitude of servers, machines, and network storage devices in communication with one another over a communication network. Embodiments of the electronic discovery system 2 can be implemented across diverse platforms, networks, computer systems, applications and the like to capture or otherwise collect electronic data and properly organize and barcode the data for long-term storage and for producing the data to a requesting party.

For purposes of the presently described embodiments of the invention, the electronic discovery system 2 includes a data source 4, a staging-and-barcoding server 6, and a data store 8. The data source 4 comprises enterprise-wide electronic data 10. According to some embodiments, the electronic data 10 includes two broad categories of data: electronic communication data 12 and electronic file data 14. Electronic communication data 12 includes data such as e-mail or the like, whereas electronic file data 14 includes other electronic forms of data, such as word processing files and the like.

The data source 4, according to some embodiments, is a database server. For example, in some embodiments, the data source is the database server 120 of FIG. 4, which is configured to provide database services for the electronic discovery system 2 and which houses: a Unified Directory/custodian database 122 for storing electronic data 10 relating to individual custodians; a case database 124 for storing electronic data relating to particular cases; and an ongoing collections database 126 for storing electronic data relating to collections currently in progress. Custodians, as described herein, are individuals, a grouping of individuals or an entry identified at the onset of a case or matter whose electronic data 10 is subject to capture and review.

An exemplary operational overview of the electronic discovery system 2 of FIG. 1 will now be provided with reference to FIGS. 1 and 2. Upon receiving a request to collect electronic data 10 that is related to a particular custodian or case (block 31), the electronic discovery system 2 searches for and collects the requested electronic data 10 from the data source 4 (block 32) in manners described in detail below with reference to FIGS. 4-12. The electronic data 10, after it is collected from the data source 4, is directed to the staging-and-barcoding server 6, which includes a barcode application 16, a staging application 20, a staging drive 22, a data filer application 24, and a data transfer application 26.

The barcode application 16 creates a label 18, such as a barcode, for the data request and stores the barcode 18 in the data store 8 (block 33). The data store 8, according some embodiments, is a long-term storage network. For example, in some embodiments, the data store 8 is the long-term storage network 190 of FIG. 4. The data store 8 is configured to store the electronic data 10 collected or otherwise harvested from the data source 4. According to some embodiments, the data request specifically request relevant electronic communication data 12 and relevant electronic file data 14. As such, for each of these data requests, the barcode application 16 creates two barcodes 18: one for electronic communication data 12 and another for electronic file data 14. It should be appreciated, however, that if the data request specifies only electronic communication data 12 or only electronic file data 14, then the barcode application 16 only creates one barcode 18 for the data request. It should also be appreciated that the data request could specify other types of data and that the barcode application 16 could create a corresponding barcode 18. In some embodiments, the barcode 18 indicates the date of the data request and the type of data requested. For example, the barcode 18 is a string of numbers that includes a number sequence, which indicates the date of the request and the type of files (e.g., electronic communication and/or electronic file data) requested. In some embodiments, the data request includes a file path to the requested electronic data 10.

As the individual files of the requested electronic data 10 are being collected, the staging application 20 stages the files of the electronic data 10 on the staging drive 22 (block 34). Once all of the files of the electronic data 10 have been collected and staging is complete, according to the illustrated embodiment, the data filter application 24 accesses the staging drive 22 to review the staged electronic data 10 and filters out the requested file types. For example, if the data request specifies electronic communication data 12 and electronic file data 14, the filter application 24 filters the electronic communication data 12 and electronic file data 14 out of the electronic data 10 (block 35). Next, the data transfer application 26 transfers the electronic data 10 from the staging drive 22 to the data store 8 and associates the requested files types with the corresponding barcodes. For example, if the data request specified electronic communication data 12 and the electronic file data 14, then the data transfer application 26 transfers the files that are electronic communication data 12 and the files that are electronic file data 14 and then associates the files with the appropriate barcodes 18 (block 36). That is, according to this example, the data transfer application 26 associates the files that are electronic communication data 12 with the barcode 18 label for electronic communication, and the data transfer application 26 associates the files that are electronic file data 14 with the barcode 18 labeled for electronic file data. Thus, one of the barcodes 18 is associated with files that are electronic communication data 12 and that are relevant to the data request, and the other one of the barcodes 18 is associated with files that are electronic file data 14 and that are relevant to the data request.

Once the requested electronic data 10 is stored in the data store 8 and associated with appropriate barcode 18, the data typically undergoes re-reformatting and quality control processing. Then the requested electronic data 10 is ready for production and may be released to the requesting party.

Referring now to FIG. 3, shown is a more detailed block diagram depiction of a staging-and-barcoding server 6 incorporated in the electronic discovery system 2 of the present invention, according to some embodiments of the present invention. The staging-and-barcoding server 6 is configured to, for each data request, create at least one barcode, stage the electronic data collected from the data sources, filter the staged electronic data to identify the requested file types, and associate the identified file types with the corresponding barcodes, in accordance with aspects of the present invention. The staging-and-barcoding server 6 may include one or more of any type of computerized device. The present apparatus and methods can accordingly be performed on any form of computing device.

The staging-and-barcoding server 6 includes computing platform 38 that can receive and execute routines and applications. The computing platform 38 includes memory 39, which may comprise volatile and non-volatile memory, such as read-only and/or random-access memory (RAM and ROM), EPROM, EEPROM, flash cards, or any memory common to computer platforms. Further, the memory 39 may include one or more flash memory cells, or may be any secondary or tertiary storage device, such as magnetic media, optical media, tape, or soft or hard disk.

Further, the computing platform 38 also includes processor 40, which may be an application-specific integrated circuit ("ASIC"), or other chipset, processor, logic circuit, or other data processing device. The processor 40 or other processor such as ASIC may execute an application programming interface ("API") 41 that interfaces with any resident programs, such as barcoding module 44, staging module 46, data filtering module 48, hash value verification module 50, data amount verification module 52, or the like stored in the memory 39 of the staging-and-barcoding server 6.

The processor 40 includes various processing subsystems 42 embodied in hardware, firmware, software, and combinations thereof, that enable the functionality of the staging-and-barcoding server 6 and the operability of the server on a network. For example, the processing subsystems 42 allow for initiating and maintaining communications and exchanging data with other networked devices. For the disclosed aspects, the processing subsystems 42 of the processor 40 may include any subsystem used in conjunction with the barcoding module 44, the staging module 46, the data filtering module 48, the hash value verification module 50, the data amount verification module 52 or subcomponents or submodules thereof.

The computer platform 38 additionally includes communications module 43 embodied in hardware, firmware, software, and combinations thereof, that enables communications among the various components of the staging-and-barcoding server 6, as well as between the other devices in the electronic discovery system 2. Thus, the communications module 43 may include the requisite hardware, firmware, software and/or combinations thereof for establishing a network communication connection.

The barcoding module 44 resides in the memory 39 of the computing platform 38 and is configured to operate in the same manner as the previously described barcode application 16. The staging module 46 also resides in the memory 39 of the computing platform 38 and includes a data staging application 46*a*, which is configured to operate in the same manner as the previously described staging application 20. The staging module 46 further includes a file log application 46*b* configured to create a file log containing metadata about each file of the electronic data 10 as the files are acquired on the staging drive. It should be appreciated that the file log could be a file or a dataset in a database. After staging is complete and the electronic data 10 is transferred to and saved in the data store 8, the file log is transferred to and saved in a location separate from the electronic data 10. Saving the file log separate from the electronic data 10 is helpful for purposes of discovery because the file log can be referenced at a later date to answer any questions about the collection process that may arise during the course of a litigation or investigation.

The data filtering module 48, which resides in the memory 39 of the computing platform 38 and includes a file type identifier application 48*a* and a file transfer application 48*b*, is configured to filter the electronic data 10 that is staged by data staging application 46*a* to identify the requested file types and then transfer the requested file types in datasets to the data store 8 so as to associate each dataset of requested file types with the appropriate barcode. According to some embodiments, the file type identifier application 48*a* accesses the electronic data 10, when the electronic data 10 is being staged by the staging drive 46b, and identifies the requested file types by reviewing the file extension of each file in the electronic data 10. Once the file type identifier application 48a has reviewed the electronic data 10 and identified the request file types, the data transfer application 48b transfers copies of the identified files, which are grouped in datasets according to file type, to the data store 8 and associates each dataset with the appropriate barcode.

According to some embodiments, if the data request is a request for all electronic data 10 related to a particular custodian or case, the data filtering module 48 is configured to bifurcate the relevant electronic data 10 into a dataset comprising the electronic communication data 12 and a dataset comprising the electronic file data 14, and then transfer the datasets to the data store 8 and associate the dataset comprising communication data 12 with one barcode 18 and associate the other dataset comprising file data 14 with another barcode 18. In operation, the file type identifier application 48a reviews the file extension of each file to identify the data type of each file. Then the file type identifier application 48a groups the electronic data 10 into datasets, e.g., a dataset comprising communication data 12 or a dataset comprising file data 14, based on file type.

For example, to identify the electronic communication data 12, the file type identifier application 48a reviews the file extension of each file in the electronic data 10 and identifies those files that have one of the following extensions: .EML, MSG., .IPD, .NSF or the like. The file type identifier application 48a then groups those files into a dataset comprising communication data 12. The file type identifier 48a identifies electronic file data 14 in a similar fashion: it identifies files that have an extension that indicates the file is electronic file data 14. The file type identifier application 48a then groups those files into a dataset comprising file data 14. In certain embodiments, to identify file data 14, the file type identifier 48a identifies all files that are not electronic communication data as being electronic file data.

Once the file type identifier 48a has identified the data 10, the data transfer application 48b transfers the datasets to the data store 8 and associates the dataset of electronic communication data 12 with one barcode and the dataset of electronic file data 12 with another barcode.

The hash verification module 50, which resides in the memory 39 of the computing platform 38 and includes a hash value calculator application 50a and a hash value verifier application 50b, is configured to provide assurance that the electronic data 10 transferred to the data source 8 arrives intact. The hash verification module 50 provides both an error-checking function and an anti-tampering function.

The error-checking function ensures that the electronic data 10 is transferred to the data store 8 intact. To do so, the hash value calculator application 50a calculates the hash value of the electronic data 10 as the data is being staged. And, after the electronic data 10 has been copied and transferred to the data store 8, the hash value verifier application 50b compares the hash value of the electronic data 10 in the data store 8 to the hash value of the original electronic data. If the hash values are identical, then the hash value verifier application 50b indicates that the electronic data 10 was transferred to the data store 8 intact and, according to some embodiments, purges the staged electronic data 10.

To provide the anti-tampering function, the hash value calculator application 50a calculates the hash value of the electronic data 10 as it is transferred on to the data store 8 and then stores the hash value in a location separate from the data store 8. For example, as discussed in more detail below, the hash value is stored in a collections server 130. When the electronic data 10 is later accessed on the data store 8 for processing, the hash value verifier application 50b compares the hash value of the electronic data 10 on the data store 8 to the hash value previously calculated and stored in the separate location. If the hash values match, then the hash value verifier application 50b verifies that the electronic data 10 was not modified. However, if the hash values do not match, the hash value application 50b indicates that the electronic data 10 was modified while stored on the data store 8.

Turning now to the data amount verification module 52, which provides quality assurance for the electronic discovery system 2 by ensuring that the electronic discovery system 2 procures all of the electronic data 10 that a third-party purports to send. The data amount verification module 52 resides in the memory 39 of the computing platform 38 and includes a data amount calculator application 52a and a data amount verifier application 52b.

In operation, a third-party submits to the electronic discovery system 2 a message count indicating the amount of electronic data 10 that third party intends to send. As the electronic data 10 is being received from the third-party, the data amount calculator application 52a calculates the amount of electronic data 10 that successfully transferred. For example, according to some embodiments, the data amount calculator application 52a counts the number of files transferred or counts the number of bytes transferred from the third-party.

After the data amount calculator application 52a calculates the amount of electronic data 10 that was actually transferred, the data amount verifier application 52b compares the amount of electronic data 10 that was actually transferred to the message count indicating the amount of electronic data 10 that third-party intended to send. If the actual data amount matches the intended data amount, then the data amount verifier application 50b indicates that the third party indeed submitted the intended amount. Otherwise, the data amount verifier application 50b fails the transaction.

According to some embodiments, instead of calculating the amount of electronic data 10 while the data is actually being transferred, the electronic data 10 is copied to a separate location, in addition to being copied to the data store 8. The data amount calculator application 52a then counts the number of files or bytes that were copied to the separate location. This enables the data amount calculator application 52a to calculate the data amount without modifying the hash value of the electronic data 10 stored on the data store 8.

As a means of providing an overview of a composite, enterprise-wide electronic discovery system, which may be implemented in conjunction with the organizing and barcoding processes described above, FIGS. 4-12 are herein provide and described in detail. It should be noted that the system shown and described in relation to FIGS. 4-12 are by way of example only and, as such, presently described embodiments of the invention may be embodied within other electronic discovery systems or only implement select portions of the electronic discovery system herein described.

FIG. 4 illustrates an exemplary electronic discovery system 100 in accordance with an embodiment of the invention. In some embodiments, the environment of the electronic discovery system 100 is the information technology platform of an enterprise, for example a national or multi-national corporation, and includes a multitude of servers, machines, and network storage devices in communication with one another over a communication network. Embodiments of the electronic discovery system 100 can be implemented across diverse platforms, networks, computer systems, applications and the like to capture or otherwise harvest electronic data and properly organize and label the data for long-term storage and for producing the data to a requesting party.

According to the embodiment illustrated in FIG. 4, the electronic discovery system 100 includes an electronic discovery management server 110, at least one database server 120, a collections server 130, enterprise personal computers 140, enterprise file servers 150, including at least one personal network storage area and at least one shared network storage area, enterprise email servers 160, a conversion services server 170, a short-term staging drive 180, and a long-term network storage network 190 that are all in communication over a communication network 102. The communication network 102 may be a wide area network, including the Internet, a local area network or intranet, a wireless network, or the like.

As shown in the block diagram of FIG. 5, the electronic discovery management server 110 provides user interface management for via user interface 118. In some embodiments, the electronic discovery management server 110 is a web server that can be accessed via a web browser. In one particular embodiment, the electronic discovery management server 110 is an intranet website server that may be accessed utilizing a web browser on a machine within the enterprise. Through the electronic discovery management server 110, the user interface 118 may be presented to a user for the purposes of managing the electronic discovery process and all processes described herein that are inherent thereto. For illustrative purposes, it may be assumed herein that the primary user interacting with the user interface 118 is an employee or contractor of the company who serves an electronic discovery management role, and hereafter is referred to as the "e-discovery manager." As discussed in greater detail below, the e-discovery manager may utilize the user interface 118 to manage cases, custodians, collections, and collected data. It should be appreciated, however, that any individual could use the user interface 118 to perform the manual functions herein attributed to the e-discovery manager, and, indeed, that an automated process could perform those functions as well.

Referring again to FIG. 4, the electronic discovery management server 110 is in communication with the database server 120 and the collections server 130 via the communication network 102. The database server 120, as shown in the block diagram of FIG. 6, is configured to provide database services for the electronic discovery management server 110, including housing the Unified Directory/custodian database 122, which includes data relating to individual custodians, the case database 124, which includes data relating to particular cases, and ongoing collections database 126, which includes data relating to collections being undertaken by the collections server 130. Each of the foregoing databases within the database server 120 is discussed in detail below. It should be understood that multiple database servers could be employed instead of a single database server, and reference to a single database server is for illustrative and convenience purposes only. For example, the Unified Directory 122 could be stored in one database server and the ongoing collections data 126 could be stored in another database server.

Regardless of the number of database servers employed, it is an object of embodiments of the present invention that data relating to custodians and cases be stored in the database server 120 independently. While custodian data in the Unified Directory 122 and case data in the case database 124 may be linked or correlated within the database server 120, for example, when custodians are assigned to particular cases, custodians may be managed separately from cases. Therefore, when a case is initialized and a custodian is assigned to the case, information for that custodian (such as data storage locations for that custodian) is accessed by the electronic discovery management server 110 in the Unified Directory 122 in the database server 120 and linked to the particular case, rather than manually input by the e-discovery manager into the case.

Furthermore, in addition to separating (but allowing linkage of) custodian management and case management processes, and as discussed further below, data management processes relating to the collection of data from custodian storage locations during electronic discovery are also separated from case management and custodian management processes. In this regard, the data collected from a particular custodian is stored separately from both the custodian information and any relevant case information (as discussed below, it is stored in long-term network storage network 190), but is linked to a custodian, which is in turn linked to one or more cases. This is advantageous because in the event a particular custodian is assigned to multiple cases, data collected from the custodian may be shared with the other case(s) to which the custodian is assigned. Therefore, the various processes and components of the electronic discovery system 100 may be categorized within one of case management, custodian management, or data management. And even though cases, custodians, and collected data may all be managed separately, there are necessarily links between the various datastores to allow management of the overall electronic discovery process.

Custodian

With regard to custodian management, according to some embodiments of the present invention, the Unified Directory/custodian database 122 houses information relating to all potential custodians within the enterprise and the locations where those custodians store data. The information stored in the Unified Directory 122 may include for a particular custodian, for example, the custodian's name, position, human resources identifier (a unique number for each employee of the enterprise), employment location, domain, email addresses, network user identification, personal computer(s) name, paths of network storage devices used by the custodian, including Shared Drives and HomeSpaces, work history, related persons (such as managers, team members or subordinates), and any other information that may be relevant to the discovery process. Since the human resources identifier is always unique for each custodian, in some embodiments, the Unified Directory 122 may be organized around the human resources identifier. All of the information relating to how the Unified Directory 122 is generated is a multi-step process that utilizes multiple tools and methods of identifying relevant information.

For example, the electronic discovery management server 110 or the database server 120 may interface with the computer databases of the human resources computer systems of the enterprise to copy the information from the human resources databases into the Unified Directory 122. In some embodiments, the electronic discovery management server 110 may also reach out to a network directory, such as Windows Active Directory, to identify network resources related to particular custodians and integrate this information into the custodian entries including the copied human resources information. Information for the Unified Directory 122 may also be obtained from the managers of the information technology network, i.e., those individuals responsible for setting up email accounts for custodians and managing the various file servers of the enterprise. Furthermore, in addition to retrieving information in the manners described above, in some embodiments, information in the Unified Directory 122 is generated through tools initialized and/or deployed by the electronic discovery management server 110. In particular, in some embodiments, as shown in FIG. 4, a profile scanning tool 112, and a mapping tool 114 are provided.

The profile scanning tool 112 may be deployed by the electronic discovery management server 110 and is configured to crawl the communication network 102, scan each of the enterprise personal computers 140, and transmit to the database server 120 identifying information about each computer, such as computer name and IP address, and a list of all profiles, including demographics information, (or network user identification) associated with each computer. According to different embodiments, the profile scanning tool 112 may be run on the electronic discovery management server 110, the collection server 130, or another server in the communication network 102. In some embodiments, the profile scanning tool 112 is further configured to identify and transmit to the database server 120 the most recent date and time at which a particular profile was logged on to the machine. When information relating to a particular computer is received by the database server 120, the database server 120 uses the profile information, which may include several user identifications, to link the particular computer to the custodians in the Unified Directory 122 associated with those user identifications. The database server 120 may also record in each custodian's entry in the Unified Directory 122 the last time the computer was accessed by the custodian, according to the profile information transmitted by the profile scanning tool 112. Thus, the profile scanning tool 112 ultimately generates a list of personal computers used by each custodian, and this list may be presented to the e-discovery manager when a collection of a custodian's local machine(s) is initialized, as discussed in detail below.

In accordance with some embodiments of the invention, the mapping tool 114 is configured to crawl the communication network 102 and examine the enterprise file servers 150 residing on the communication network 102 to locate and identify the path of any personal network storage area on each server. As used herein, a personal network storage area is a network storage area associated with a single user who reads data from or writes data to it. Personal network storage areas may be in the form of network storage devices or folders or other resources within a network storage device and may be referred to hereafter for clarity purposes as "HomeSpaces." According to different embodiments, the mapping tool 114 may be run on the electronic discovery management server 110, the collection server 130, or another server in the communication network 102. In some embodiments, the mapping tool 114 is a Windows service that is scheduled to execute through use of Windows Scheduled Task. As the mapping tool 114 crawls the communication network 102, it is configured to examine each file server and transmit to the database server 120 the path of any network storage area within the plurality of servers 134 that it positively identifies as a HomeSpace. In some embodiments, the mapping tool 114 is configured to explore the enterprise file servers 150 by obtaining and reviewing the directories on each server and evaluating the paths of each network storage area therein, including folders and other storage devices and resources.

With regard to identifying a particular network storage area as a HomeSpace, according to some embodiments, the mapping tool 114 is configured to utilize conventional naming techniques for paths in the communication network 102 to identify those paths of network storage areas within the enterprise file servers 150 that include an indicator, based on the conventional naming techniques, that the particular storage areas associated with those paths are accessed and used by only one user, and are therefore HomeSpaces. In accordance with some embodiments of the invention, each user of the communication network 102 is assigned to at least one user identification and those user identifications are the indicators that the mapping tool 114 attempts to locate within paths when identifying HomeSpaces. In such embodiments, it is the convention that the paths of HomeSpaces on the communication network 102 include the user's user identification. On the other hand, paths of shared network storage areas do not include user identifications. Therefore, the mapping tool 114 may explore the directories of each server within the plurality of servers, evaluate each path in turn, and make a determination as to whether or not the path includes a user identification.

If it is determined that the path includes the designated indicator, for example, a user identification, the mapping tool 114 is configured to positively identify the particular network storage area identified by that path as a HomeSpace and transmit to the database server 120 the particular user identification and the path of the HomeSpace. When that information is received by the database server 120, the database server 120 uses the user identification to link the particular HomeSpace to the custodian in the Unified Directory 122 associated with that user identification. In some embodiments, the mapping tool 114 is also configured to recognize and transmit, and the database server 120 is configured to house, an indication of the last time the HomeSpace was accessed by the particular user, for example, the last time any data was read from and/or written to the HomeSpace. Additionally, in some embodiments, the mapping tool 114 is configured to recognize when multiple paths map to the same network storage area. The collection server 130 compares paths for the same user to determine if duplicative entries exist. This advantageously enables avoidance of multiple collections of the same data. Thus, the profile scanning tool 112 ultimately generates a list of HomeSpaces used by each custodian, and this list may be presented to the e-discovery manager when a collection of a custodian's HomeSpaces is initialized, as discussed in detail below.

In addition to storing a list of personal computers and HomeSpaces used by a particular custodian, which lists were generated by the profile scanning tool 112 and the mapping tool 114 respectively, in accordance with some embodiments of the present invention, the database server 120 is also configured to store a list of any shared network storage areas used by the custodian. As used herein, a shared network storage area is a network storage area associated with multiple users who read data from and/or write data to it. Shared network storage areas may also be in the form of network storage devices or folders or other resources within network storage devices and may be referred to hereafter for clarity purposes as "Shared Drives." The user interface 118 is configured to receive a path of a Shared Drive input by the e-discovery manager and store the path in the Unified Directory 122 in relation to one or more custodians' human resources identifier(s). More particularly, in some embodiments, once a particular user of the communication network 102 is chosen for the collection process, the e-discovery manager may undertake to identify the particular shared network resources that that individual is using, and eventually, the paths associated with those shared network resources. This may be accomplished through conversations with the particular individual, by utilizing data returned from the local collection tool 132 executed on collection server 130 (shown in the block diagram of FIG. 7) deployed to the particular user's machine (as discussed in detail below), and/or by utilizing a file browsing tool 116 executed on electronic discovery manager server 110 (as shown in FIG. 5).

According to some embodiments of the present invention, the file browsing tool 116 is configured to be utilized by the e-discovery manager through the user interface 118. The file browsing tool 116 gives the e-discovery manager elevated authority within the communication network 102 to access, in a limited manner, the enterprise file servers 150 within the communication network 102. While the file browsing tool 116 may not allow access to the actual files stored on certain file servers, it allows the e-discovery manager to browse through the directories of the file servers 150, locate files that have been accessed by the custodian, and determine the size of the files. In accordance with some embodiments, the e-discovery manager may initially have a general idea of a particular file server within the enterprise file servers 150 that the custodian has used in the past. For example, the custodian may communicate to the e-discovery manager a particular folder name and/or drive name on which he/she has stored files. Additionally, in some embodiments, the e-discovery manager may have already undertaken a local collection process on the custodian's machine, wherein the local collection tool 132 returned a list of the network resources that the user of that machine has used. In that event, the e-discovery manager may be aware of the particular drive referenced by the user. The e-discovery manager may then employ the file browsing tool 116 to browse out to the particular drive mentioned, scan the folders for any folder having a name resembling that name given by the user, identify any particular files created by and/or accessed by the user, determine the size of such files, and retrieve the path of any folder (or Shared Drive) including data belonging to the user.

The retrieved paths of the Shared Drives may then be added, either manually or automatically, to the Unified Directory 122 in the database server 120. Thus, the Unified Directory 122 may store in connection with one custodian (and in particular in relation to the custodian's human resources identifier) a list of the personal computers, HomeSpaces, and Shared Drives associated with that custodian. Each of these locations is a potential source of data stored by the custodian, and once an investigation or collection of a custodian is initiated, the location information stored in the Unified Directory 122 may be accessed to determine the particular storage locations that need to be addressed during the investigation/collection. This is advantageous as it allows a completely automated investigation/collection process, rather than relying on the e-discovery manager to manually input the targeted machines and file servers at the time of collection.

It should be noted that the Unified Directory 122 may be regularly or continuously updated as new information is gathered using the tools described herein. More particularly, the electronic discovery management server 110 may be configured to automatically retrieve data from the human resources databases and Active Directory and any other relevant sources, such as information technology directories or lists, as well as deploy the profile scanning tool 112 and the mapping tool 114, at regularly scheduled intervals. Alternatively, rather than periodically retrieving data from the various data sources such as the human resources databases, the system 100 may be configured such that the database server 120 is continuously interfacing with the data sources such that the Unified Directory 122 is updated in real-time as the data within the data sources change. In either instance, each of the feeds of information into the Unified Directory 122 is regularly updated to ensure that the data in the Unified Directory 122 is current.

In some embodiments, the database server 120 is configured such that all historical data relating to a custodian is stored in relation to that custodian's human resources identifier in the Unified Directory 122. Thus, when the feeds of information into the Unified Directory 122 are updated, in the event data relating to the custodian has changed, the database server 120 is configured to store in the Unified Directory 122 the new data and any relevant metadata, including, for example, the time and date of the change, as well as maintain a record of the old data so that it is still a part of the custodian's profile in the Unified Directory 122. For example, in the event the profile scanning tool 114 identifies a new personal computer associated with a custodian and one of the personal computers associated with the custodian previously is no longer identified, the database server 120 is configured to store in the Unified Directory 122 the information for each computer, as well as indications as to when the new computer was first identified and when the old computer was no longer identified. In this way, the custodian profile within the Unified Database 122 may include a history of the personal computers used by the custodian. Such information may be relevant at the time of investigation or collection of the custodian.

One feed of information into the Unified Directory 122 which is particularly relevant to electronic discovery is employment status. According to some embodiments, when the feed of information from the human resources databases to the Unified Directory 122 includes a change as to employment status of a particular custodian, the electronic discovery management server 110 is configured to recognize the change and possibly perform particular functions in response. More specifically, in the event it is recorded in the Unified Directory 122 that the employment status of a particular custodian changes from active to terminated, the electronic discovery management server 110 is configured to determine whether the custodian is assigned to any case or matter, and, if so, to transmit to the designated manager or contact for the case or matter an electronic communication notifying the manager of the terminated status and inquiring as to whether the manager would like the terminated custodian's data collected. In the event the manager responds in the affirmative, the electronic discovery management server 110 is configured to automatically initiate the various collection processes of the present invention. Therefore, the custodian's data may be advantageously collected prior to any destruction or unavailability that could be caused by the termination. Alternatively, in other embodiments, the electronic discovery management server 110 may not communicate with the manager and may automatically initiate collection upon recognizing a change in employment status.

Case

With regard to case management processes, according to some embodiments, a case may be initialized by the e-discovery manager utilizing the user interface 118. In this regard, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager), custodians, etc. The electronic discovery management server 110 is configured to store this information in the case database 124 in the database server 120. The case database 124 is configured to house this information such that all information relating to a particular matter or case is related within the case database 124 and a user can use the user interface 118 to view a profile of the matter or case including all the information.

Once the matter and/or case has been initialized, the e-discovery manager may add custodians to the matter or case. In some embodiments, the electronic discovery management server 110 is configured to add numerous custodians to a single matter or case at one time. In this regard, the e-discovery manager may use the user interface 118 to enter in identifying information about the custodians. The identifying information for each custodian does not have to be of the same type. For example, a name may be entered for one custodian, an email address for another, a network user identification for another, and a human resources identifier for another. The user interface 118 is configured to receive the identifying information in different input areas depending upon the type of identifying information being received. The electronic discovery management server 110 is configured to use the input information to search the Unified Directory 122 in the database server 120 to determine which custodians are associated with the input information. In the case of a human resources identifier being entered, only one custodian in the Unified Directory 122 may be a match. On the other hand, in the case of a name being entered, multiple custodians may be a match.

The electronic discovery management server 110, after searching the Unified Directory 122 with the input identifying information, is configured to present through the user interface 118 a list of all custodians matching the input identifying information. In the event only one match was returned for a particular set of input identifying information, the electronic discovery management server 110 is configured to automatically select the custodian to be added to the case or matter. On the other hand, in the event more than one match was located for a particular set of input identifying information, then the multiple matches may be presented together to the e-discovery manager through the user interface 118 and marked so that the e-discovery manager must review the multiple custodian profiles associated with the matches to determine the correct custodian that should be added to the case or matter. In doing so, the e-discovery manager may consider the other information in the profiles, such as corporate title, work location, associated custodians, etc. Such information can inform the e-discovery manager as to whether the located custodian is the one intended. The e-discovery manager may then select the correct custodian for addition to the case or matter and confirm that all custodians selected may be added to the case or matter. According to some embodiments, "adding" a custodian to a case or matter involves linking correlating the custodian profile in the Unified Directory 122 to the case or matter in the Case database 124.

According to some embodiments, upon adding custodians to a matter, the electronic discovery management server 110 is configured to initiate the transmission of preservation notices and surveys to the custodians. In this regard, preservation notices and surveys relevant to the particular case or matter are stored in or linked to the case profile in the case database 124. Transmission of the preservation notices and surveys to custodians added to the case may be automated, for example, there may be preset instructions within the case profile that cause the electronic discovery management server 110 to transmit a particular preservation notice and survey at a particular date or time or upon a particular triggering event, such as a custodian being added to the case, or the e-discovery manager may manually cause the preservation notices and surveys to be transmitted. In some embodiments, the electronic discovery management server 110 is configured to transmit the preservation notices and surveys via a standard email function. The surveys may be tied to the preservation notices such that they are transmitted to custodians together, and one survey may be tied to more than one preservation notice. When a custodian responds to a survey, the survey response is received by the electronic discovery management server 110 and stored in relation to the relevant custodian in the case profile in the case database 124. Furthermore, the electronic discovery management server 110 may be configured to store all or a portion of the data received in the survey response in the Unified Directory 122 in the custodian's profile.

According to some embodiments, each transmission of a preservation notice and survey to a custodian, and each corresponding response, is tracked in the relevant case profile in the case database 124. The electronic discovery management server 110 may also be configured to transmit reminder notices if responses to the surveys are not received within a predefined period of time. The electronic discovery management server 110 may also be configured to schedule reminder notices to be sent to custodians to periodically refresh the custodians' memory of their duty to preserve files/documents pertaining to the matter. In some embodiments, once a preservation notice has been sent to a custodian, the electronic discovery management server 110 may undertake to prevent any reimaging or refreshing of the custodian's personal computer(s) by transmitting an alert of the preservation notice to the enterprise's information technology management group. In addition, the survey responses received from custodians serve to inform the collection process. For example, one survey may inquire as to what network storage devices the custodian uses when storing data. The answer that the custodian gives to the survey may inform the addition of Shared Drives to the custodian profile in the Unified Database 122 that may be used later in collection.

According to some embodiments of the present invention, the e-discovery manager may utilize the user interface 118 to add attachments, notes, tasks, and search terms to a case or matter. In some embodiments, the contacts/managers for a case may also access the case profile in the case database 124 using a web browser and may add attachments, notes, tasks, and search terms to be stored therein. Thus, the e-discovery manager may not be the only entity with access to the case and case management tools of the electronic discovery management server 110. The subject matter of the attachments, notes and tasks could be anything relevant to the case or matter. In some embodiments, the tasks are tasks that particular custodians must complete and the electronic discovery management server 110 is configured to transmit a notice to the custodians that that the task needs to be completed, perhaps using standard email functions. With regard to attachments, the e-discovery manager, or the contact/manager of the case, may upload relevant files to be attached to the case profile.

With regard to the search terms, the e-discovery manager or the case contacts or managers may add certain terms to the case profile to be applied when searching the collected data to locate data responsive or relevant to the underlying issues in the case. Storing the search terms within the case profile is advantageous as it creates a record of the searching that is to be undertaken with respect to the data and aids in organization of the data, as discussed further below.

According to some embodiments of the present invention, when a decision is made that it is time to collect from certain custodians in a matter, the e-discovery manager may use the user interface 118 to release the custodians from the matter to the underlying case. This release triggers the commencement of collection of the custodians' data. In some embodiments, the electronic discovery management server 110 is configured to allow all custodians assigned to the matter to be released to the case at the same time. In addition, in instances where the e-discovery manager has previously created groups of custodians within the case, the electronic discovery management server 110 is configured to allow a group of custodians to be released from a matter to a case at the same time.

Data

Once a custodian has been identified for collection, whether manually by the e-discovery manager or by being released from a matter to a case, the electronic discovery system 100 is configured to automatically collect the custodian's data using the location information stored in the Unified Directory 122. Therefore, the electronic discovery management server 110 accesses the custodian profile of the custodian to be collected in the Unified Directory 122 and determines, from the information stored therein, the different locations of data storage for the particular custodian that must be collected. There are many different locations that the system 100 can address, including personal computers, email accounts, and network storage areas, including HomeSpaces and Shared Drives.

If a custodian profile (for a custodian released for collection) includes at least one personal computer(s) associated with the custodian, then the electronic discovery management server 110 may undertake to collect the files on these machines. Therefore, the electronic discovery management server 110 may retrieve the relevant machine identifying information, such as domain, name, IP address, etc., and may initialize deployment of a local collection tool 132 running on collections server 130 (as shown in FIG. 7).

The local collection tool 132 is configured to be deployed from the collections server 130 or another server within the network 102 to any of the enterprise personal computers 140. Therefore, for a particular custodian, the local collection tool 132 is configured to utilize the machine identifying information supplied by the electronic discovery management server 110 to be deployed to the identified custodian computer. According to one embodiment, the local collection tool 132 is configured to be automatically installed on the target custodian's personal computer. The local collection tool 132 is further configured to generate a snapshot of the data residing on the local storage of the personal computer 140, for example, by using a commercially available tool such as the Volume Shadow Copy Service, store the snapshot in a storage area on the personal computer, and transmit copies of the files included in the snapshot to the collections server 130. By transmitting the data from the snapshot of the data stored on the hard drive of the personal computer, the local collection tool 132 advantageously allows the custodian to continue to use her machine without substantial interference from the local collection tool 132 and even interact with the data stored on the hard drive as the snapshot of the data is being transmitted to the collections server 130.

In addition to the functions described above, the local collection tool 132 may also be configured to transmit to the database server 120 a catalog of the files included in the snapshot to be stored in the ongoing collections database. This catalog may be referenced by the collections server 130 in order to determine whether collection is complete and to resume interrupted collections at the point of interruption. Additionally, in accordance with some embodiments, the local collection tool 132 is configured to compile and transmit to the electronic discovery management server 110 a list of network resources the user is using, including, for example, network applications and file servers that the user has used or accessed. This list of resources may be stored in the database server 120 in the custodian's profile in the Unified Directory 122. With regard to transmission of the files themselves, according to one embodiment of the invention, the local collection tool 132 is configured to compress, hash, and upload the files included in the snapshot to the collections server 130.

In some embodiments, the electronic discovery management server 110 may utilize a computer watching tool 117 to determine when to attempt a collection from a custodian's machine. The computer watching tool 117 is configured to monitor the network 102 and determine which of the enterprise personal computers 140 are online. Therefore, in the event there is a custodian whose local machine needs to be collected, the computer watching tool 117 is configured to determine when that machine joins the network 102 (i.e., when it appears to the computer watching tool 117) and inform the electronic discovery management server 110 that it should initialize the local collection tool 132 immediately.

If a custodian profile (for a custodian released for collection) includes any paths for HomeSpaces or Shared Drives, then the electronic discovery management server 110 may undertake to collect the files from these file servers by initializing the file server collection tool 134 running on collection server 130 (as shown in FIG. 7). The file server collection tool 134 is configured to access the file server located at the given path, whether the file server is a HomeSpace or a Shared Drive, copy the data residing on the file server, and compress, hash, and transmit the copied data to the collections server 130. The file server collection tool 134 may be programmed with preset instructions that allow it to only copy files meeting certain criteria, for example, files that have certain file extensions. Alternatively, the programmed instructions may prevent the file server collection tool 134 from copying files having certain file extensions or other attributes. Either of the foregoing is advantageous if the e-discovery manager is not interested in copying executable files or source code, for example. In some embodiments, the file server collection tool 134 is also configured to generate a size estimate of the files residing on the targeted file server. In one embodiment, the file server collection tool 134 may automatically begin the collection process (copying and transmitting data) if the size estimate falls below a predetermined threshold. In addition, in some embodiments, the file server collection tool 134 is configured to determine whether a particular folder that it is collecting from a file server includes more than a token amount of nearline files, and, in the event that the folder does include such nearline files, choose to not collect such files so as to avoid overloading the server. Therefore, according to different embodiments, the file server collection tool 134 copies all or a portion of the files residing on a file server located at the path given in the released custodian's profile and transmits them to the collections server 130.

If a custodian profile (for a custodian released for collection) includes an email address for an email account on the enterprise email server 160, then the electronic discovery management server 110 may undertake to collect the files from the enterprise email server 160 by initializing the active email collection tool 136 running on collections server 130 (as shown in FIG. 7). In some embodiments, the active email collection tool 136 is configured to access the particular Microsoft Exchange server within the enterprise email server 160 on which the custodian's account resides (which is known based on the information included in the Unified Directory 122), copy all email located there, including emails deleted by the custodian up to a predetermined period of time prior to the collection, (for example, seven days prior to the collection) and transmit the copied emails to the collections server 130.

Regardless of the storage resource location from which data is being collected, or the particular type of data being collected, the collections server 130 is configured to store the data first (while the collection is still ongoing) in the short-term staging drive 180 until the particular collection is complete.

Furthermore, the collections server 130 transmits the barcode information to the electronic discovery management server 110 to be stored in the database server 120, for example, in the custodian's profile in the Unified Database 122, in relation to the stored information about the particular collection, whether it was a local collection, an active email collection, a file server collection, etc. Therefore, the barcode can be used for reference at a later date to determine the origin of the data. After the data has been copied to the long-term storage area network 190, the collections server 130 compares the hashing of the data in permanent storage to the original data in the staging drive 180 and, if the hashing is identical, purges the data from the staging drive 180.

Once the data has entered the long-term storage area network 190, it is not necessarily ready for review. Indeed, it is likely that the data may need to be processed before it is searchable and suitable for review by investigators and attorneys. For example, the files may be encrypted in the form in which they are collected and sent to the long-term storage area network 190. Therefore, according to some embodiments, the data may be copied to the conversion services server 170 where a series of decryption and standardization functions may be applied to it. After the data is decrypted and standardized, it is returned to the long-term storage area network 190 and may remain there to be accessed for review purposes.

With reference now to FIG. 8, a block diagram is provided that illustrates the electronic discovery management structure of the present invention, according to some embodiments. As illustrated in FIG. 8, certain processes described herein may be categorized within one of case management, as represented by Block 200, custodian management, as represented by Block 220, or data management, as represented by Block 240. As described above, the electronic discovery system 100 is arranged such that cases, custodians and data may be managed independent of one another. However, there is still an element of the categorization of processes within the categories that is conceptual, and it should be understood that certain processes may be correctly assigned to more than one category. Therefore, while the architecture of the system 100 allows separate management of custodians, cases, and data, certain processes of the present invention may affect more than one of the foregoing.

The first process that falls within the case management category is creation of a matter or case as a framework for litigation support activities, as shown in Block 202. As described above, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager) etc.

It is noted that custodian information is stored separately from the case information allowing for the same custodian in multiple cases. This provides for the electronic discovery system of the present invention to have scalability, whereby evidence associated with one custodian may be used in multiple cases.

The electronic discovery management server 110 stores this information in the case database 124 in the database server 120. The case database 124 houses this information such that all information relating to a particular matter or case is related within the case database 124 and a user, such as a manager or contact, can use the user interface 118 to view and edit a profile of the matter or case.

The next process within case management is the creation of preservation notices and surveys specific to the matter, as shown in Block 204. In this regard, the e-discovery manager may, through the user interface 118, either generate a new preservation notices or surveys relevant to the particular case or matter to be stored in the case profile in the case database 124 or, alternatively, link a preservation notice or survey already stored in the database server 120 to the case profile of the specific case or matter at issue. Also within case management is the creation of search terms pertinent to the case, as represented by Block 206. As described above, the e-discovery manager or a contact or manager for the case may use the user interface 118 to input individual search terms or search term sets to be applied to the data harvested in the case. In some embodiments, the search terms may be limited to be used with particular custodians and/or with particular harvested data types. The search terms will be saved in the case database 124 so that they may be readily applied to harvested data and used in connection with storing the resulting responsive data.

The processes of entering relevant attachments, notes and updates to a particular case or matter also falls within the case management category, as demonstrated by Blocks 208 and 210. The e-discovery manager or a case contact or manager may use the user interface 118 to upload documents and enter notes and other relevant data, including updates and reminders, to be stored in the case profile of the case in the case database 124. Once these attachments, notes and updates are added, they may be referenced whenever a user views the case profile through the user interface 118. The cost estimation modules of the present invention are also processes that are categorized as case management processes, as shown in Block 212. In this regard, the electronic discovery management server 110 utilizes a cost estimation tool to determine the cost of harvesting and reviewing data, based on a number of factors including, for example, number of custodians, amount of harvested data, data types, etc. Finally, case management also includes a number of tasking and workflow processes that are represented by block 214.

Moving now to custodian management, certain processes falling within the category of custodian management are shown in Block 220. While the processes involving generation of the Unified Directory 122 certainly could be categorized as custodian management, the processes shown in FIG. 8 include those processes involving management of custodians within the scope of a case or matter. In that regard, the first process of custodian management included in FIG. 8 is the addition of custodians to a case or matter, as shown in Block 222. As described above, the e-discovery manager may use the user interface 118 to link a custodian's profile from the Unified Directory 122 to the particular case profile in the case database 124. Thus, the custodian profile and case profile are correlated. The next processes within custodian management is the transmission of preservation notices and surveys to custodians, as shown in Block 224, and the presentation of the surveys to custodians, as shown in Block 226. The electronic discovery management server 110 uses the contact information in the custodian's profile in the Unified Directory 122 to transmit the preservation notice(s) and survey(s) stored in the case profile to the custodian. In some embodiments, a standard email function is used, so that the only information needed from the Unified Directory 122 is the custodian's email address. When the custodian checks her email, the survey will appear as a message therein, and when she opens that message, the survey will be presented to her. The survey may be configured such that when she fills it out, the survey is automatically transmitted back to the database server 120 for storage in the case profile and the custodian's profile.

Also falling within custodian management is the process of releasing custodians from a matter to a case, as shown in Block 228. The e-discovery manager uses the user interface 118 to mark the custodian's profile so that the custodian is now activated for collection of data. This may occur within the case database 124 since the custodian's profile is linked thereto. Once the custodian is released/marked, the electronic discovery management server 110 may access the custodian's profile and initialize collection based on the various data storage locations identified in the profile. Therefore, as represented by Block 230, the electronic discovery management server 110 may automatically determine the data types and locations of data to be harvested by accessing the custodian's profile in the Unified Directory 122. Alternatively, the e-discovery manager may manually make the same determination by accessing and viewing the custodian's profile. Finally, as with case management, custodian management also includes a number of tasking and workflow processes that are represented by Block 232.

The last category is data management, represented by Block 240. One major set of processes within data management are the processes relating to the harvesting of data, as shown in Block 242. These processes include the collection of data from all the different storage areas of a particular custodian, including the custodian's local storage on her personal computer(s), the custodian's network storage areas, the custodian's email, and any other areas, as are described herein. All of the data in the various storage areas is copied and transmitted to the collections server 130, as described in detail for each particular collection tool or process. Upon reaching the collections server 130, data resulting from a particular collection is temporarily stored in the short-term staging drive 180 until the collection is complete, at which point it is stored in the long-term storage area network 190 in association with a specific identifying barcode. The foregoing process is represented by Block 244. The data may require decryption or standardization functions to be applied to it in order for it to be searchable and/or otherwise usable, so the next process that falls within data management is the copying of the data to the conversion services server 170 for analysis and conversion as necessary, as shown in Block 246. Once the data is converted, it is returned to the long-term storage area network 190 to be used in review.

Also falling within data management is the association of particular data sets with particular sets of search terms stored in the case profile of the case database 124. In this regard, certain search terms stored in the case profile are stored with the intention of being applied to certain types of data and/or certain custodian's data. Alternatively, certain search terms may be applied to all data collected for a specific case. In either instance, the electronic discovery management server 110 accesses the case profile, determines the search terms to be applied, and associates the search terms with the barcode of the appropriate data sets in long-term storage. Thus, the search terms will be applied to that data and the results will be generated and presented to reviewers for analysis. Finally, as with the other management categories, data management also includes a number of tasking and workflow processes that are represented by Block 250.

With reference to FIG. 9, an exemplary process for managing a case is provided, in accordance with one embodiment of the present invention. As represented by Block 302, a case or matter is created by the e-discovery manager and stored in the case database 124. Next, custodians are added to the case, as shown in Block 304, by linking the custodian profiles of the Unified Directory 122 to the case profile. Next, as represented by Block 306, the e-discovery manager and/or the case contact or manager adds search terms to be applied to data harvested for the case, including instructions as to applying the search terms to particular data types or custodians. Block 310 represents the determination that must be made as to whether there is a matter or just a case. If there is no matter because preservation notices are not required, for example, for an audit, then the process will move straight to the initialization of data collection. On the other hand, if there is matter, rather than just a case, then the creation of preservation notices is required, as shown in Block 312.

The preservation notice, as shown in Block 314 is transmitted to the custodians added to the matter, perhaps using email. As shown in Block 316, a reminder notice module may be employed. As shown in Block 318, the reminder notice module transmits periodic reminder notices to custodians. The notices may be sent over email and may remind custodians about the preservation notice and/or remind custodians to fill out surveys. With regard to surveys, in the event a survey is required or desired, according to Block 320, a survey is created. The survey may be saved in the case profile in the case database 124. As shown in Block 322, it is possible to enable the survey to be attached to and transmitted with the preservation notices.

Next, as shown in Block 324, the e-discovery manager may release custodians from the matter to the case, which initialized collection of the custodian's data. As shown in Block 326, the e-discovery manager or the electronic discovery management server 122 accesses the custodian profile, determines the data types and location to be collected, and initializes the applicable collection tools to go collect the data. Once the data has been collected and a unique barcode has been assigned to each dataset based on the particular custodian and storage location from which it originated, as shown in Block 328, the search terms previously stored in the case profile may be assigned to the dataset based on the input instructions regarding the search terms. These search terms may be applied to the dataset and the results saved to be presented to reviewers for analysis.

With reference to FIG. 10, an exemplary process for managing a custodian is provided, in accordance with one embodiment of the present invention. First, as represented by Block 402, a custodian is added to a matter or case. In this regard, the custodian's profile in the Unified Directory 122 is linked to the relevant case or matter profile. In order to locate the custodian's profile, a custodian search module may be employed, as shown in Block 404. Therefore, the e-discovery manager may enter any identifying information about the custodian, whether it is the custodian's name, network user identification, email address, etc. The custodian search module will take the input information and search the Unified Directory 122 for a match. If more than one match is obtained, the user interface 118 will present all matches and allow the e-discovery manager to browse the associated profiles to determine the intended custodian. In this way, the correct custodian is identified and the profile of that custodian is linked to the appropriate case or matter.

As represented by Block 406, the electronic discovery management server 110 may determine whether the particular custodian added is a member of the enterprise "do-not-call list." In this regard, there may be an indication in the custodian's profile in the Unified Directory 122 that the particular custodian should not be contacted regarding collections, and an alternative contact should be used, such as an administrative assistant of the custodian. Alternatively, there may be a separate do-not-call list stored in the database server 120 that must be accessed and searched to determine whether or not the custodian appears on that list. In either instance, a determination is made as to whether or not the custodian should be directly contacted, and in the event the custodian should not be directly contacted, the contact information for the custodian's assistant (or other stand-in) should be obtained. This information will be used later for transmitting preservation notices and surveys.

Next, in accordance with Block 408, a determination is made by the electronic discovery management server 110 as to whether the custodian has been added to a matter or a case. If it is a case, then the custodian is verified, as shown in Block 424, supplemental data may be added to the custodian profile in the Unified Directory 122 as required, as shown in Block 426, and then the various collection tools are initialized by the electronic discovery management server 110 for collection of the custodian's data, as shown in Block 428. On the other hand, if it is a matter, then preservation notices are required. Therefore, as shown in Block 410, a preservation notice is sent via email to the custodian or custodian stand-in. As shown in Block 412, the custodian may then be inactivated from the case because, for some reason, data does not need to be collected from the custodian. In the future, when it comes time to collect from the custodian, the custodian will be reactivated, as shown in Block 422.

After a preservation notice is sent, a determination is made by the electronic discovery management server 110 as to whether a survey is required, as shown in Block 414. It should be noted that in alternate embodiments the decision on whether to send a survey may be made prior to sending the preservation notice. In such alternate embodiments, if the survey is required, it may become a component of the preservation notice and, thus, accessed simultaneously by the custodian. If a survey is required, it is transmitted in conjunction with a preservation notice, and the answers are collected by the electronic discovery management server 110 and stored in the database server 120, as shown in Block 416. Reminder notices for the preservation notices and surveys may also be transmitted to the custodian, as shown in Block 420. Next, once it is time to collect data, the custodian is released from the matter to the case, as shown in Block 418, and the various collection tools are initialized by the electronic discovery management server 110 for collection of the custodian's data, as shown in Block 428. In this process, the custodian's profile in the Unified Directory 122 is accessed in order to determine the various locations where the custodian may have stored data. Finally, as shown in Block 430, the custodian's data is collected.

Referring to FIGS. 8 and 9, flow diagrams are presented of a method 500 for harvest data from various data sources, in accordance with embodiments of the present invention. At Event 502, the collection of data ensues and, at Event 504, the type of data is identified. Data Block 506 signifies active email that is collected from an exchange system or the like. At Event 508 the automated active email collection tool is implemented to collect email from identified email address. As previously noted, and in accordance with present embodiments of the invention, if a custodian profile (for a custodian released for collection) includes an email address for an email account on the enterprise email server (160), then the electronic discovery management server (110) may undertake to collect the files from the enterprise email server (160) by initializing the active email collection tool (136) running on collections server (130). In some embodiments, the active email collection tool (136) is configured to access the particular Microsoft Exchange server within the enterprise email server 160 on which the custodian's account resides (which is known based on the information included in the Unified Directory 122), copy all email located there, including emails deleted up to a designated prior period, for example, seven days prior to the collection, and transmit the copied emails to the collections server (130). The email collection tool is also capable of implementing bulk requests and for collecting email on a scheduled basis, such as daily. The email collection tool is additionally capable of being implementing enterprise wide and requires no server identifiers or the like to collect the active email. In this regard, the email collection tool (136) serves to reduce security risk.

At Event 510, a barcoding tool is implemented at a staging location, such as short-term staging drive (180) to attach a barcode to the set of email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180). As such, barcoding is performed without the need to execute the barcoding tool on an exchange server and, as such no human intervention is needed in the barcode process. In accordance with embodiments of the present invention, one barcode may be assigned per custodian, per data type and per event (i.e., case, matter, etc.)

At Event 512, the collected email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 514, the collected and barcoded active email data is copied to a processing drive for subsequent analysis. It should be noted that the nature of email data obviates the need to perform conversion and/or decryption on the data set. At Event 516, the active email data set is loaded into the analysis tool and, at Event 518, the data set is exported to the requestor/reviewer for analysis.

Data Block 520 signifies other non-exchange server based email, such as email accessed through a client-server, collaborative application, such as Lotus Notes® or the like. At Event 522, NSF files or any other file types associated with non-exchange server based email is manually harvested from an enterprise-grade email server having collaborative capabilities, such as a Lotus Domino server or the like.

At Event 522, a barcoding tool is implemented at a staging location, such as short-term staging drive (180) to attach a barcode to the set of non-exchange server email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180).

At Event 526, the collected non-exchange server email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 528, the NSF files or any other file types associated with non-exchange server based email that may be encrypted is decrypted using a decryption tool, in accordance with embodiments of the present invention. The encryption of NSF files occurs at the user level and, therefore only the user has the password necessary for decryption. The decryption tool allows for decryption of the NSF file-type data without the knowledge of the user/encrypter. The decryption tool finds ID files that exist anywhere in the enterprise system, creates a database of the ID files, associates the database with the user/encrypter and subsequently decrypts the data.

At Event 530, the non-exchange server email data set is loaded into the analysis tool and, at Event 532, the data set is exported to the requestor/reviewer for analysis.

Data Block 534 signifies journaled data, such as electronic commerce data stored on a repository for the purpose of regulation, compliance to regulating bodies, such as the Securities and Exchange Commission (SEC) or the like. At Event 536, criteria is extracted from input system and manually entered in a designated third party system for data retrieval.

At Event 538, the barcoding tool is implemented at a staging location, such as short-term staging drive (180) to attach a barcode to the set of journaled data resulting from the particular collection. The barcoded data is then copied and communicated to the long-term storage area network (190) for permanent storage. At Event 540, the collected and barcoded journaled data may be associated with a specific search term set or sets.

At Event 542 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files and the like.

At Event 544, the journaled data set is loaded into the analysis tool and, at Event 546, the journaled data set is exported to the requestor/reviewer for analysis.

Referring to FIG. 12, data block 548 signifies data from a local Personal Computer (PC), such as enterprise PC (140). At Event 550, the local collection tool (132) is implemented to collect data from designated PCs by taking a "snapshot" of the device's hard drive. According to one embodiment of the invention, the local collection tool may be autodeployed thus, obviating the need for any manual entry by the e-discovery manager or the like. In other embodiments of the invention, the local collection tool (132) may be employed to collect data from network storage.

At Event 552, the barcoding tool is implemented at a staging location, such as short-term staging drive (180) to attach a barcode to the set of local PC data resulting from the particular collection. The barcoded data is then copied and communicated to the long-term storage area network (190) for permanent storage. At Event 554, the collected and barcoded local PC data may be associated with a specific search term set or sets.

At Event 556 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files, IPD formatted files and the like.

At Event 558, the local PC files that may be encrypted are decrypted using a decryption tool, in accordance with embodiments of the present invention. The decryption tool allows for decryption of the PC files data without the knowledge of the user/encrypter. The decryption tool finds ID files that exist anywhere in the enterprise system, creates a database of the ID files, associates the database with the user/encrypter and subsequently decrypts the data.

At Event 560, the local PC data set is loaded into the analysis tool and, at Event 562, the local PC data set is exported to the requestor/reviewer for analysis.

Data block 564 signifies data from network storage, such as a shared drive or HomeSpace. At Event 566, the file server collection tool (134) is implemented to automatically collect data from shared drives and/or HomeSpace. According to one embodiment of the invention, the file server collection tool (134) may be autodeployed thus, obviating the need for any manual entry by the e-discovery manager or the like.

At Event 568, the barcoding tool is implemented at a staging location, such as short-term staging drive (180) to attach a barcode to the set of network storage data resulting from the particular collection. The barcoded data is then copied and communicated to the long-term storage area network (190) for permanent storage. At Event 570, the collected and barcoded network storage data may be associated with a specific search term set or sets.

At Event 572 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files, IPD formatted files and the like.

At Event 574, the network storage files that may be encrypted are decrypted using a decryption tool, in accordance with embodiments of the present invention. The decryption tool allows for decryption of the network storage data without the knowledge of the user/encrypter. The decryption tool finds ID files that exist anywhere in the enterprise system, creates a database of the ID files, associates the database with the user/encrypter and subsequently decrypts the data.

At Event 576, the network storage data set is loaded into the analysis tool and, at Event 578, the network storage data set is exported to the requestor/reviewer for analysis.

Data block 580 signifies electronic data for forensics. At Event 582, a forensic collector tool, such as EnCase® may be executed on the devices of interest to collect data. According to one embodiment of the invention, the forensic collector tool may be automatically deployed on the device of interest without the knowledge of the device user. In accordance with another embodiment of the invention, a computer watcher tool may be implemented (not shown in FIG. 12) that watches the network to determine the addition or subtraction of computers to the network based on ID's/IP addresses returned from the network.

At Event 584, the barcoding tool is implemented at a staging location, such as short-term staging drive (180) to attach a barcode to the set of forensic data resulting from the particular collection. The barcoded data is then copied and communicated to the long-term storage area network (190) for permanent storage. At Event 586, the collected and barcoded forensic data may be associated with a specific search term set or sets.

At Event 588 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing may be required on EML formatted files, MSG formatted files, IPD formatted files and the like.

At Event 590, the forensic files that may be encrypted are decrypted using a decryption tool, in accordance with embodiments of the present invention. The decryption tool allows for decryption of the network storage data without the knowledge of the user/encrypter. The decryption tool finds ID files that exist anywhere in the enterprise system, creates a database of the ID files, associates the database with the user/encrypter and subsequently decrypts the data.

At Event 592, the forensic data set is loaded into the analysis tool and, at Event 594, the network storage data set is exported to the requestor/reviewer for analysis.

Data block 596 signifies collaborative data, such as data residing at discovery sites, for example LiveLink® or the like. At Event 598, a discovery site collector tool, such as a LiveLink® collector tool may be executed on the devices of interest to collect data. According to one embodiment of the invention, the discovery site collector preserves at least a portion of the discovery site database in the e-discovery database, including all files and all revisions of the files. In this regard, the discovery site collector tool queries against the database to define what files need to be retrieved, then copies those files based on the result of the query. Metadata pertaining to the files is retained in the case management system tables. In accordance with another embodiment of the invention, the discovery site collector tool collects the documents and the related metadata and uses the metadata to automatically rename the files.

At Event 600, the barcoding tool is implemented at a staging location, such as short-term staging drive (180) to attach a barcode to the set of discovery site data resulting from the particular collection. The barcoded data is then copied and communicated to the long-term storage area network (190) for permanent storage. At Event 602, the collected and barcoded discovery site data may be associated with a specific search term set or sets.

At Event 604 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing may be required on EML formatted files, MSG formatted files, IPD formatted files and the like.

At Event 606, the discovery site data set is loaded into the analysis tool and, at Event 608, the discovery site data set is exported to the requestor/reviewer for analysis.

Thus, present embodiments herein disclosed provide for improvements in electronic discovery. Embodiments herein disclosed provide for an enterprise wide e-discovery system that provides for data to be identified, located, retrieved, preserved, searched, reviewed and produced in an efficient and cost-effective manner across the entire enterprise system. In addition, by structuring management of e-discovery based on case/matter, custodian and data and providing for linkage between the same, further efficiencies are realized in terms of identifying, locating and retrieving data and leveraging results of previous e-discoveries with current requests.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for collecting, labeling and storing data in an electronic discovery system, comprising:
   receiving an electronic discovery data request to collect electronic data from a data source, wherein the data request specifies more than one data type;
   using a computing device processor to:
      create a plurality of electronic labels, each electronic label associated with a corresponding data type included in the data request, and including machine-readable code configured to indicate the data type and the date of the data request;
      store the plurality of electronic labels on an electronic discovery permanent storage network;
      stage the electronic data by collecting, in response to receiving the data request, a plurality of individual files of the electronic data from the data source and storing the files on an electronic discovery staging drive until collection is completed;
      filter the collected electronic data to identify a data type for each of the files and group the plurality of files into data type-specific data sets;
      transfer the data sets from the electronic discovery staging drive to the electronic discovery permanent storage network; and
      associate the data sets with a corresponding electronic label based on a data type associated with the data set and the corresponding electronic label.

2. The method of claim 1, further comprising:
   using a computing device processor to:
      collect metadata from the files of the electronic data as the files are being transferred to the electronic discovery permanent storage network;
      store the metadata in a file log; and
      store the file log separate from the files of the electronic data by storing the file log in a database that is separate from the electronic discovery permanent storage network.

3. The method of claim 1, wherein using the computing device processor to filter further comprises using the computing device processor to filter the electronic data to identify data of an electronic communication data type and designating remaining non-filtered electronic data as electronic file data type.

4. The method of claim 1, further comprising:
   using a computing device processor to:
      receive an expected-number-of-files indicator from a third party, wherein the expected-number-of-files indicator specifies a number of files of the electronic data that are to be collected from the data source.

5. The method of claim 4, further comprising:
   using a processor to:
      determine an actual-number-of-files indicator that specifies a number of files of the electronic data that were actually transferred to the electronic discovery permanent storage network and associated with one of the data types, wherein the actual-number-of-files indicator is determined by counting files as files are transferred from the electronic discovery staging drive to the electronic discovery permanent storage network;
      compare the expected-number-of-files indicator and the actual-number-of-files indicator; and
      provide a failure notification if the actual-number-of-files indicator does not match the expected-number-of-files indicator.

6. The method of claim 1, further comprising:
   using a processor to:
      receive an expected-data-amount indicator from a third party, wherein the expected-data-amount indicator specifies an aggregated size of files in the electronic data that is to be collected from the data source.

7. The method of claim 6, further comprising:
   using a processor to:
      determine an actual-data-amount indicator that specifies an aggregated size of files that were actually included in the electronic data and that were actually transferred to the long-term storage network and associated with one of the data types, wherein the actual-data-amount indicator is determined by summing a size of each of the files transferred from the electronic discovery staging drive to the electronic discovery permanent storage network;
      compare the expected-data-amount indicator and the actual-data-amount indicator; and provide a failure notification if the actual-data-amount indicator does not match the expected-data-amount indicator.

8. The method of claim 1, further comprising:
using a processor to:
calculate a hash value for the electronic data while the files are being transferred to the electronic discovery permanent storage network;
store the hash value separate from the files of the electronic data by storing the hash value in a database that is separate from the electronic discovery permanent storage network.

9. The method of claim 8, further comprising:
receiving a processing request for the electronic data that is stored on the electronic discovery permanent storage network; and
using a processor to ensure that the electronic data was not modified while it was stored on the electronic discovery permanent storage network by:
calculating a second hash value for the electronic data while the files are being transferred off of the electronic discovery permanent storage network;
comparing the second hash value to the hash value that was calculated when the files of the electronic data were transferred to the electronic discovery permanent storage network.

10. The method of claim 1, wherein the data request includes a file path for retrieving the electronic data.

11. A system for collecting, labeling and storing data in an electronic discovery system, the system comprising:
a computing platform including at least one processor and a memory in communication with the processor;
data collection instructions stored in the memory, executable by the processor and configured to receive an electronic discovery data request which specifies more than one data type requiring collection and, in response to receipt of the data request, collect electronic data from a data source, wherein the electronic data includes a plurality of individual files;
electronic label instructions stored in the memory, executable by the processor and configured to (1) create a plurality of electronic labels, each electronic label associated with a corresponding data type included in the data request and including machine-readable code configured to indicate the data type and the date of the data request, and (2) store the plurality of electronic labels on an electronic discovery permanent storage network;
staging instructions stored in the memory, executable by the processor and configured to stage and temporarily store the collected electronic data on an electronic discovery staging drive until collection is completed;
data filtering instructions stored in the memory, executable by the processor and configured to (1) filter the collected electronic data to identify a data type for each of the files and (2) group the plurality of files into data type-specific data sets; and
data transfer instructions stored in the memory, executable by the processor and configured to (1) transfer the data sets from the electronic discovery staging drive to the electronic discovery permanent storage network and (2) associate the data sets with a corresponding electronic label based on a data type associated with the data set and the corresponding electronic label.

12. The system of claim 11, further comprising:
data amount verification instructions stored in the memory, executable by the processor and configured to (1) determine a number of files that were actually transferred to the electronic discovery permanent storage network and (2) compare the number of files that were actually transferred to an expected number of files.

13. The system of claim 12, wherein the expected number of files is received from a third party.

14. The system of claim 12, wherein the expected number of files represents a number of files stored on the data source that are of one of the file type and that are included in the electronic data.

15. The system of claim 12, wherein the validation instructions are further configured to provide a failure notification if the number of files that were actually transferred does not match the expected number of files.

16. The system of claim 11, wherein the processor is further comprising:
data validation instructions stored in the memory, executable by the processor and configured to (1) calculate a hash value for the files of the electronic data when the files are transferred to the electronic discovery permanent storage network and (2) store the hash value in a database that is separate from the electronic discovery permanent storage network.

17. The system of claim 16, wherein the data validation instructions are further configured to ensure that the files of the electronic data were not modified while stored on the electronic discovery permanent storage network by (1) calculating a second hash value for the files of the electronic data when the files are transferred off of the electronic discovery permanent storage network and (2) comparing the second hash value to the previously calculated hash value.

18. A computer program product comprising a non-transitory computer-readable medium having computer-readable program instructions stored therein, wherein the computer-readable program instructions comprise:
first instructions configured to receive an electronic discovery data request to collect electronic data from a data source, wherein the data request specifies more than one data type;
second instructions configured to create a;
third instructions configured to store the plurality of electronic labels on electronic discovery permanent storage network;
fourth instructions configured to stage the electronic data by collecting, in response to receiving the data request, a plurality of individual files of the electronic data from the data source and storing the files on an electronic discovery staging drive until collection is completed;
fifth instructions configured to filter the collected electronic data to identify a data type for each of the files and group the plurality of files into data-type specific data sets;
sixth instructions configured to transfer the data sets from the electronic discovery staging drive to the electronic discovery permanent storage network; and
seventh instructions configured to associate the data sets with a corresponding electronic label based on a data type associated with the data set and the corresponding electronic label.

19. The computer program product of claim 18, further comprising:
eighth instructions configured to collect metadata from the files of the electronic data as the files are being transferred to the electronic discovery permanent storage network;

ninth instructions configured to store the metadata in a file log; and tenth instructions configured to store the file log separate from the files of the electronic data by storing the file log in a database that is separate from the long-term storage network.

20. The computer program product of claim 18, wherein the fifth instructions are further configured to filter the electronic data to identify data of an electronic communication data type and designate remaining non-filtered electronic data as electronic file data type.

21. The computer program product of claim 18, further comprising:

eighth instructions configured to receive an expected-number-of-files indicator from a third party, wherein the expected-number-of-files indicator specifies a number of files of the electronic data that are to be collected from the data source.

22. The computer program product of claim 21, further comprising:

ninth instructions configured to determine an actual-number-of-files indicator that specifies a number of files of the electronic data that were actually transferred to the electronic discovery permanent storage network and associated with one of the data types, wherein the actual-number-of-files indicator is determined by counting files as files are transferred from the electronic discovery staging drive to the electronic discovery permanent storage network;

tenth instructions configured to compare the expected-number-of-files indicator and the actual-number-of-files indicator; and eleventh instructions configured to provide a failure notification if the actual-number-of-files indicator does not match the expected-number-of-files indicator.

23. The computer program product of claim 18, further comprising:

eighth instructions configured to receive an expected-data-amount indicator from a third party, wherein the expected-data-amount indicator specifies an aggregated size of files in the electronic data that is to be collected from the data source.

24. The computer program product of claim 23, further comprising:

ninth instructions configured to determine an actual-data-amount indicator that specifies the aggregated size of files that were actually included in the electronic data and that were actually transferred to the electronic discovery permanent storage network and associated with one of the data types, wherein the actual-data-amount indicator is determined by summing a size of each of the files transferred from the staging drive to the electronic discovery permanent storage network;

tenth instructions configured to compare the expected-data-amount indicator and the actual-data-amount indicator; and eleventh instructions configured to provide a failure notification if the actual-data-amount indicator does not match the expected-data-amount indicator.

25. The computer program product of claim 18, further comprising:

eighth instructions configured to calculate a hash value for the electronic data while the files are being transferred to the electronic discovery permanent storage network;

ninth instructions configured to store the hash value separate from the files of the electronic data by storing the hash value in a database that is separate from the electronic discovery permanent storage network.

26. The computer program product of claim 25, further comprising:

tenth instructions configured to receive a processing request for the electronic data that is stored on the electronic discovery permanent storage network; and eleventh instructions configured to ensure that the electronic data was not modified while it was stored on the electronic discovery permanent storage network by:

calculating a second hash value for the electronic data while the files are being transferred off of the long-term storage network;

comparing the second hash value to the hash value that was calculated when the files of the electronic data were transferred to the electronic discovery permanent storage network.

27. The computer program product of claim 18, wherein the data request includes a file path for retrieving the electronic data.

* * * * *

UNITED STATES PATENT AND TRADEMARK OFFICE
CERTIFICATE OF CORRECTION

PATENT NO. : 8,200,635 B2  
APPLICATION NO. : 12/627890  
DATED : June 12, 2012  
INVENTOR(S) : Michael J. Mayer et al.

Page 1 of 1

It is certified that error appears in the above-identified patent and that said Letters Patent is hereby corrected as shown below:

Column 34, Claim 18, Line 42:

change "second instructions configured to create a" to read as follows:

-- second instructions configured to create a plurality of electronic labels, each electronic label associated with a corresponding data type included in the data request, and including machine readable code configured to indicate the data type and the date of the data request; --.

Column 34, Claim 18, Line 44:

change "labels on electronic" to read as -- labels on an electronic --.

Signed and Sealed this  
Eleventh Day of September, 2012

David J. Kappos  
*Director of the United States Patent and Trademark Office*